US008933963B1

(12) United States Patent
Garrity

(10) Patent No.: US 8,933,963 B1
(45) Date of Patent: *Jan. 13, 2015

(54) OBJECT TREES FOR MULTIPROCESSOR SYSTEMS

(71) Applicant: The MathWorks, Inc., Natick, MA (US)

(72) Inventor: Michael P. Garrity, Lexington, MA (US)

(73) Assignee: The MathWorks, Inc., Natick, MA (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/918,133

(22) Filed: Jun. 14, 2013

Related U.S. Application Data

(63) Continuation-in-part of application No. 13/665,377, filed on Oct. 31, 2012, now Pat. No. 8,514,247, which is a continuation of application No. 12/059,300, filed on Mar. 31, 2008, now Pat. No. 8,314,813.

(51) Int. Cl.
*G09G 5/00* (2006.01)
*G06T 1/00* (2006.01)

(52) U.S. Cl.
CPC .......................................... *G06T 1/00* (2013.01)
USPC ........... 345/619; 345/553; 345/537; 345/505; 345/501; 345/502

(58) Field of Classification Search
CPC .. G09G 2370/02; G06T 11/00; G06T 11/206; G06T 2210/61

USPC .......................................... 345/502, 505, 418
See application file for complete search history.

(56) References Cited

U.S. PATENT DOCUMENTS

| 6,154,215 | A  | 11/2000 | Hopcroft et al. |
| 6,658,448 | B1 | 12/2003 | Stefaniak et al. |
| 6,734,852 | B2 | 5/2004  | Sowizral et al. |
| 7,050,955 | B1 | 5/2006  | Carmel et al. |
| 7,061,486 | B2 | 6/2006  | Sowizral et al. |
| 7,170,511 | B2 | 1/2007  | Sowizral et al. |
| 7,436,406 | B2 | 10/2008 | Dautelle |
| 8,314,813 | B1 | 11/2012 | Garrity |
| 2003/0193528 | A1 | 10/2003 | Stegbauer et al. |
| 2009/0109230 | A1 | 4/2009  | Miller et al. |

OTHER PUBLICATIONS

Co-pending U.S. Appl. No. 13/665,377, filed Oct. 31, 2012 titled "Object Trees for Multiprocessor Systems" by Michael P. Garrity, 60 pages.

*Primary Examiner* — Michelle L Sams
(74) *Attorney, Agent, or Firm* — Harrity & Harrity, LLP

(57) ABSTRACT

A system may include a memory that stores instructions and a processor to execute the instructions to create a first set of objects, describing a graphical scene, in a first data structure based on data relating to the graphical scene. The processor may create a second set of objects in a second data structure based on the first set of objects in the first data structure, where at least one object of the first set of objects is associated with at least one object of the second set of objects and one or more properties for an object of the second set of objects is based on information associated with the first data structure. The processor may modify the second set of objects and provide the modified second set of objects to a browser for rendering the graphical scene.

20 Claims, 30 Drawing Sheets

RENDERED PLOT 2700

US 8,933,963 B1

OBJECT TREES FOR MULTIPROCESSOR SYSTEMS

RELATED APPLICATIONS

This application claims priority from and is a continuation-in-part (CIP) of U.S. patent application Ser. No. 13/665,377, filed Oct. 31, 2012, entitled "OBJECT TREES FOR MULTIPROCESSOR SYSTEMS," which is a continuation of U.S. patent application Ser. No. 12/059,300, filed Mar. 31, 2008 (now U.S. Pat. No. 8,314,813). The contents of these applications are incorporated herein by reference.

BACKGROUND

Contemporary computer systems typically include multiprocessor systems, where one of the processors includes a general purpose processor (e.g., a central processing unit (CPU)) and another one of the processors includes a specialized processing unit. The specialized processing unit may include a dedicated processing unit designed to perform a specific function, and is typically used to offload time consuming tasks from the general purpose processor. The specialized processing unit is usually designed to perform the offloaded tasks more efficiently then the general purpose processor. Specialized processing units may include, for example, graphics processing units (GPUs), physics processing units (PPUs), or digital signal processors (DSPs). A GPU is one example of a specialized processing unit typically used in a multiprocessor system which includes a dedicated graphics rendering device that is designed to be efficient at manipulating and displaying computer graphics.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1A:
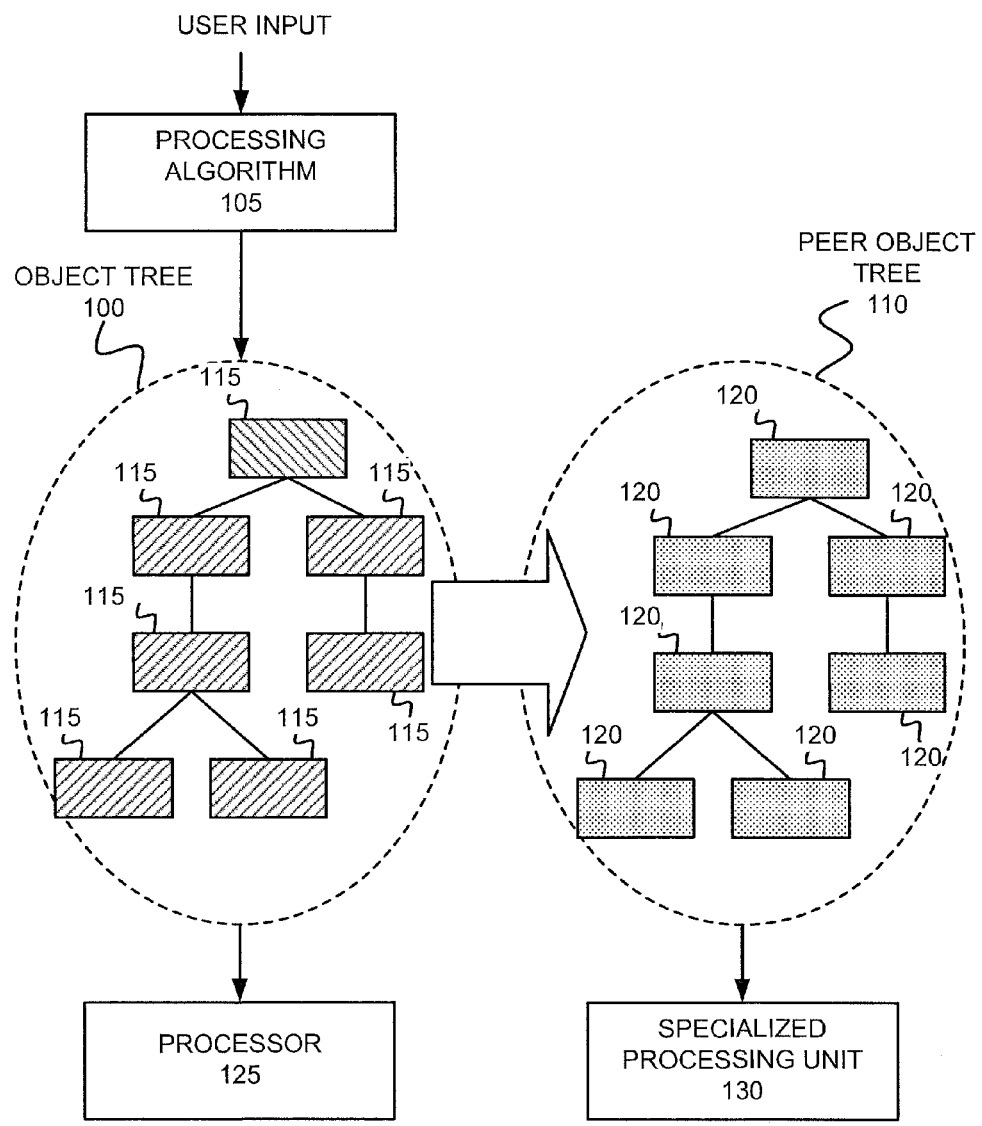
FIGS. 1A and 1B are diagrams depicting an overview of exemplary embodiments described herein.

The following detailed description refers to the accompanying drawings. The same reference numbers in different drawings may identify the same or similar elements. Also, the following detailed description does not limit the invention.

Specialized processing units may utilize certain organizations, types and/or formats of data better than other organizations, types or formats of data. For example, a specialized processing unit may efficiently handle code objects having a certain organization. Code objects (hereinafter "objects") may include pieces of software that are made up of modularized code, where the modules are referred to as "objects." An "object" as the term is used herein refers to a self-contained entity that may consist of both data and manipulation procedures (e.g., functionality). An "object" is a basic building block of programs in object-oriented programming. Data associated with a given object may set as properties of that object.

In object oriented programming, an object is a piece of code that accepts information and/or makes information available that is compliant with a known or published format (e.g., compliant with a published input or output interface). In object oriented programming, a programmer does not have to be concerned about, or have detailed knowledge of, the code that makes up a given object when the programmer wants to create other code that may use and/or interact with the object. The programmer only needs to make sure his code makes information available to the object in a compliant format and/or receives information from the object via a compliant format. Object oriented programming techniques allow complex programs (e.g., complex graphics programs) to be written by several individuals without requiring that one individual know the details of what is in an object developed by another individual.

Object oriented code may be implemented in an environment that allows objects to be arranged in formations, such as hierarchies. For example, a hierarchy may include objects arranged in a tree-like structure with branches and leaves. As described herein, multiple object trees may be created by a processing algorithm implemented by a general purpose processor. One of the created multiple object trees may be optimized to run on a different processor from the general purpose processor, such as a specialized processing unit. The object tree may, for example, be optimized so that a desired (e.g., an optimal) performance may be achieved when the object tree is processed by the specialized processing unit. As one example, data associated with one of the multiple objects may be converted to a format that provides a desired, e.g., best, performance from the specialized processing unit.

In one exemplary embodiment where the specialized processing unit includes a GPU, a user may specify a graphical scene to be rendered and a first object tree may be created to describe the graphical scene based on the user specification. A second graphics rendering tree may be created, based on the first object tree, where the second graphics rendering tree is optimized to provide a desired performance (e.g., best performance) from the GPU. During this optimization, for example, data in the first object tree may be converted to a format that provides a certain performance from the GPU (e.g., a specified performance, a threshold performance, a best performance, an optimum performance, etc.). The GPU may subsequently use the second graphics rendering tree for rendering the graphical scene specified by the user. Use of the optimized graphics rendering tree can enhance the speed and/or efficiency of the overall graphics rendering process. Creation of the graphics rendering tree, which is optimized to the GPU, prior to rendering the graphics, thus, eliminates "on the fly" data/object conversion which can slow down the rendering process.

Optimization of the graphics rendering tree can mean that data associated with a graphics rendering tree has been converted to a format that maximizes the speed and/or efficiency of use of that data by the GPU, and/or that contents of the graphics rendering tree have been organized and/or ordered (e.g., sorted) to increase the speed and/or efficiency of graphics rendering performed by the GPU. "Certain performance" as referred to herein may include a best performance, an optimum performance, a determined or specified performance and/or a threshold performance. A best performance may mean that a speed associated with the execution of a process by a specialized processing unit (e.g., a GPU) is enhanced (e.g., maximized) relative to using an object tree that has not had its data converted to a format the maximizes the speed and efficiency of use of that data by the GPU, or that has not been organized and/or ordered to increase the speed and efficiency of the graphics rendering performed by the GPU).

Overview

FIG. 1A illustrates an overview of an exemplary embodiment involving the generation of multiple object trees for use by respective ones of multiple processing units, where one of the multiple processing units includes a specialized processing unit. In the exemplary embodiment of FIG. 1A, a peer tree of a first object tree is generated that is optimized to provide the certain performance (e.g., best performance) from the specialized processing unit.

As shown in FIG. 1A, a first object tree 100 may be generated based on user input received by a processing algorithm 105, where the contents of object tree 100 may then be used by a processor 125. A peer object tree 110 may be generated, based on the contents of object tree 100, where the contents of peer object tree 110 are optimized to provide the certain performance (e.g., best performance) from specialized processing unit 130. Processing algorithm 105 may include any algorithm that can receive user input and generate an object tree 100 for use by processor 125. Object tree 100 may include one or more objects 115, which may be generated from a library (not shown), a toolbox, or the like, based on the user input and processing algorithm 105. The objects 115 of object tree 100 may be used by processor 125 during algorithm execution. The objects 115 of object tree 100 are depicted as linked in a tree structure. In other implementations, however, objects 115 may be linked as an acyclic graph or any other suitable linking structure.

Processor 125 may include any general purpose processor, such as, for example, a microprocessor or central processing unit (CPU). Specialized processing unit 130 may include a dedicated processing unit designed to perform a specific function. Specialized processing units are typically used to offload time consuming tasks from a central processing unit (CPU). Specialized processing units may perform the offloaded tasks more efficiently then a general purpose CPU or microprocessor. Specialized processing unit 130 may include, for example, a graphics processing unit (GPU), a physics processing unit (PPU), a digital signal processor (DSP), or other type of specialized processing unit. A GPU may include a dedicated graphics rendering device (e.g., for a personal computer, workstation, or game console) that is designed to be efficient at manipulating and displaying computer graphics. A PPU may include a dedicated microprocessor designed to handle physics calculations such as, for example, a physics engine of a video game. Examples of calculations involving a PPU might include rigid body dynamics, soft body dynamics, collision detection, fluid dynamics, finite element analysis, etc. A DSP may include a specialized processor designed to specifically handle digital signal processing.

Peer object tree 110 (including the contents of each object of peer object tree 110) may be generated from object tree 100 using another library (not shown) based on the contents of object tree 100. The contents of peer object tree 110, including the format of data associated with peer object tree 110, are optimized, relative to the contents of object tree 100, for providing the certain performance (e.g., best performance) from specialized processing unit 130. As shown in FIG. 1A, peer object tree 110 may include multiple objects 120. After generation of peer object tree 110, objects 120 may be used by specialized processing unit 130 during algorithm execution. The objects 120 of peer object tree 110 are depicted as linked in a tree structure. In other implementations, however, objects 120 may be linked as an acyclic graph or any other suitable linking structure.

Figure 1B:
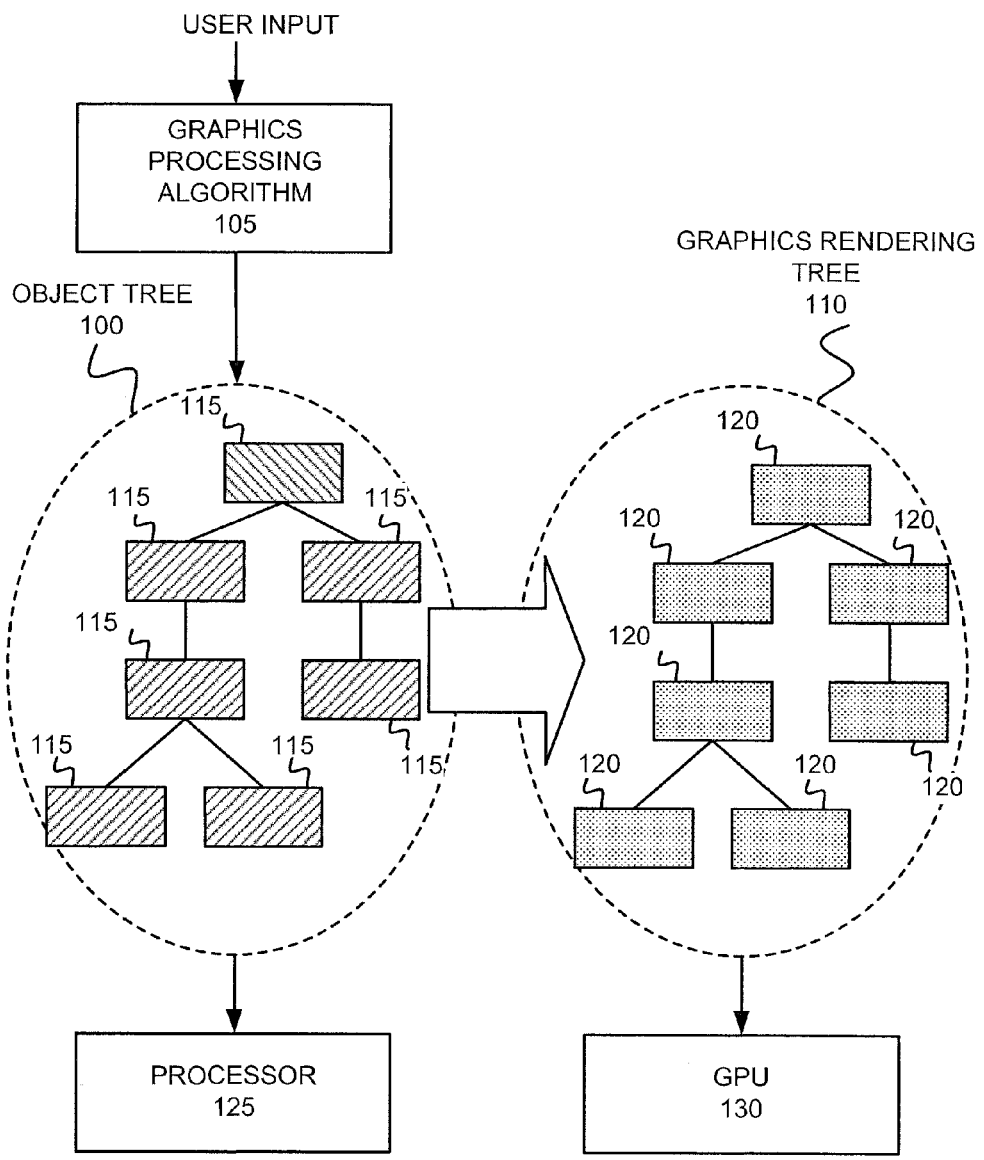

FIG. 1B illustrates an overview of another exemplary embodiment where one of the multiple processors is a GPU. As shown in FIG. 1B, object tree 100 may be generated based on user input received by a graphics processing algorithm 105. The user input received by graphics processing algorithm 105 may select the contents of a specific graphical scene to be displayed and may set the parameters of the graphical scene. A graphics rendering tree 110 may then be generated which is optimized to provide the certain performance (e.g., best performance) from GPU 130 based on the contents of object tree 100. The contents of graphics rendering tree 110, including the format of data associated with graphics rendering tree 110, are optimized, relative to the contents of object tree 100, for providing the certain performance (e.g., best performance) from GPU 130. As shown in FIG. 1B, graphics rendering tree 110 may include multiple objects 120 linked in a tree structure. The correspondence between objects in object tree 100 and graphics rendering tree 110 may be maintained through the use of cookies. A "cookie" as referred to herein refers to a unique identifier that identifies an object of object tree 100 or graphics rendering tree 110. Each object in object tree 100 may have a cookie that refers to its corresponding object in graphics rendering tree 110. Furthermore, each object in graphics rendering tree 110 may have a cookie that refers to its corresponding object in object tree 100. Thus, implementations described herein may use cookies, instead of pointers, for maintaining correspondences between objects of the two trees. In other implementations, other means of pointing from an object in one tree to its corresponding object in the other tree may be used. For example, pointers, a combination of cookies and pointers, or pointers and/or cookies in combination with other means of pointing may be used.

After generation of graphics rendering object tree 110, objects 120 may be used by GPU 130 during graphics rendering. In other implementations, the multiple objects 120 may be linked as an acyclic graph or any other suitable linking structure.

Exemplary Network

Figure 2:
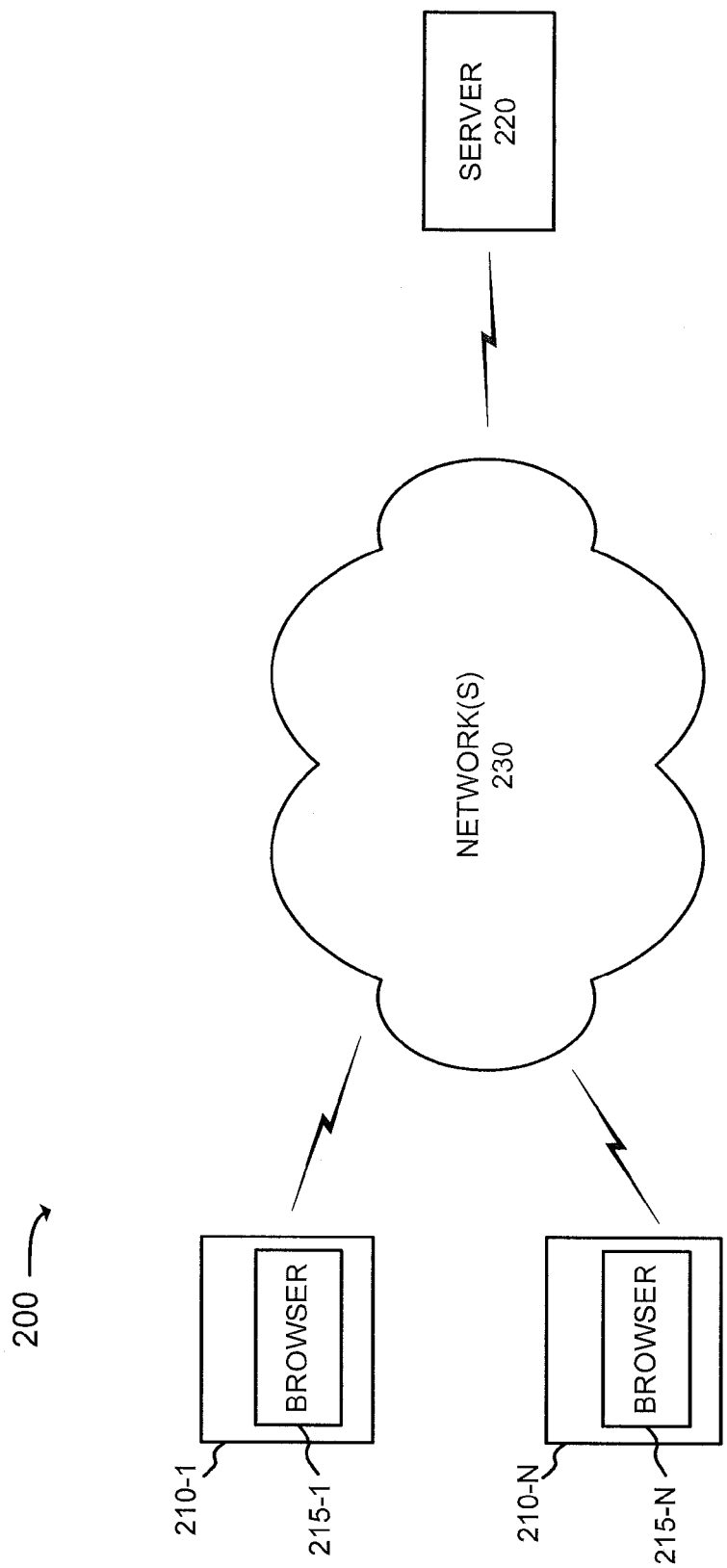
FIG. 2 is a diagram of a network according to an exemplary implementation.

FIG. 2 is an exemplary diagram of a network 200 in which systems and methods described herein may be implemented. Network 200 may include clients 210-1 through 210-N (referred to collectively as clients 210 and individually as client 210) that may connect to a server 220 via one or more network(s) 230 using browsers 215-1 through 215-N (referred to collectively as browsers 215 and individually as browser 215). Multiple clients 210 and one server 220 have been illustrated as connected to network(s) 230 for simplicity. In practice, there may be more or fewer clients and servers. Also, in some instances, a client may perform one or more functions of a server and a server may perform one or more functions of a client.

Clients 210 may include devices, such as a personal computer, a wireless telephone, a personal digital assistant (PDA), a lap top, or another type of computation or communication device, a thread or process running on one of these devices, and/or an object executable by one of these devices. Clients 210 may each receive input from respective users, create object trees and corresponding graphics rendering trees, and render graphics based on the graphics rendering trees. Server 220 may include a server device that may, in some implementations, perform various aspects of object tree creation and graphics rendering. For example, in one implementation, client 210 may receive input from a user and send, via browser 215, the input to server 220. Server 220 may receive the input, create the object tree and corresponding graphics rendering tree, and send the object tree and corresponding graphics rendering tree to browser 215. Client 210 may then render, via browser 215, the graphics based on the graphics rendering tree created at server 220.

Network(s) 230 may include one or more networks of any type, including a local area network (LAN); a wide area network (WAN); a metropolitan area network (MAN); a satellite network; a telephone network, such as the Public Switched Telephone Network (PSTN) or a Public Land Mobile Network (PLMN); an intranet, the Internet; or a combination of networks. The PLMN(s) may further include a packet-switched sub-network, such as, for example, General Packet Radio Service (GPRS), Cellular Digital Packet Data (CDPD), or Mobile IP sub-network.

Exemplary Architecture

Figure 3:
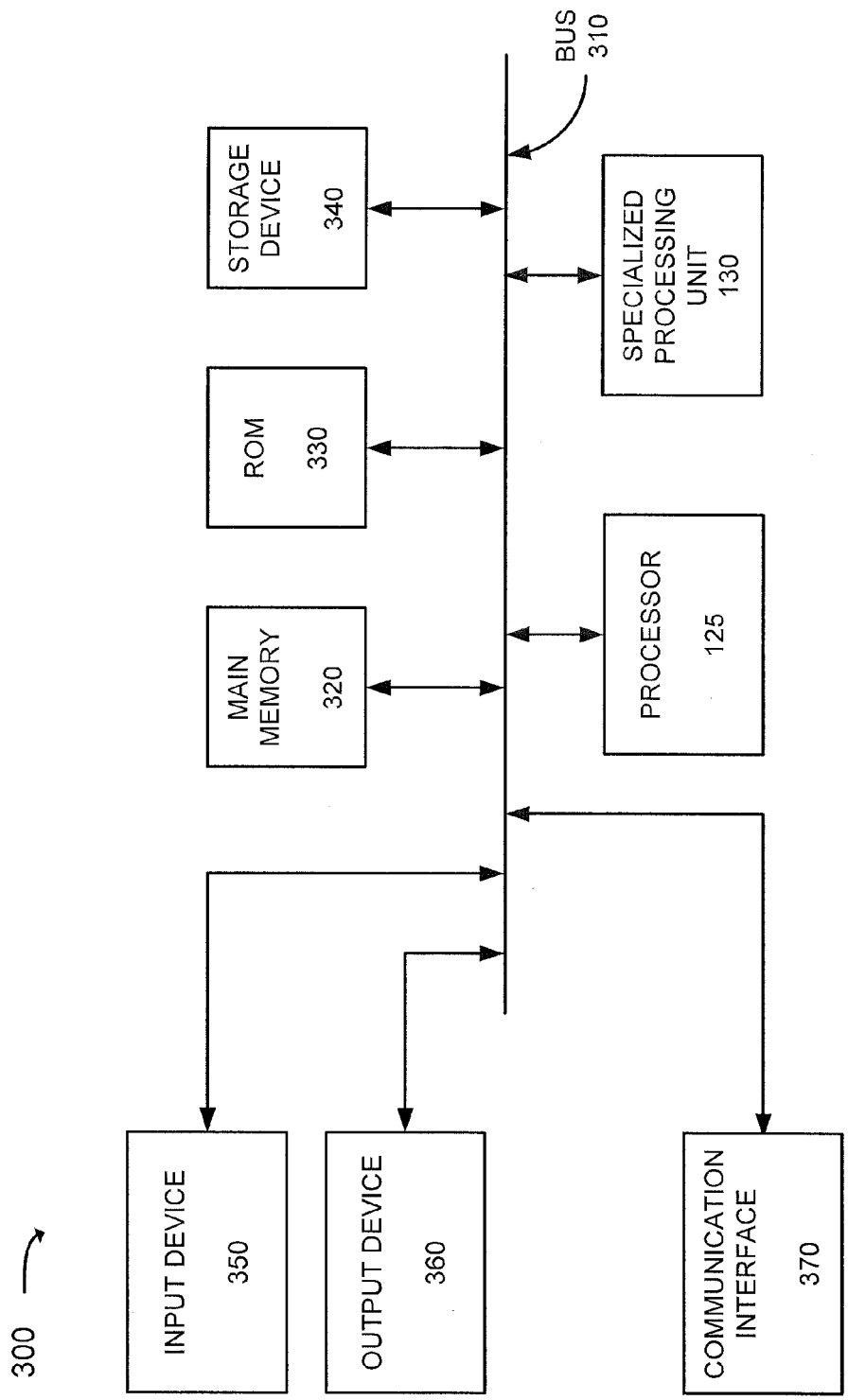
FIG. 3 is a block diagram of a device according to an exemplary implementation.

FIG. 3 is an exemplary diagram of a device 300 that may correspond to client 210 or server 220. Device 300 may include a bus 310, a processor 125, a specialized processing unit 130, a main memory 320, a read only memory (ROM) 330, a storage device 340, an input device 350, an output device 360, and a communication interface 370. Bus 310 may include a path that permits communication among the elements of device 300.

Processor 125 may include a processor, microprocessor, or processing logic that may interpret and execute instructions. Processor 125 may include, for example, a general purpose processor or microprocessor (e.g., a CPU). Specialized processing unit 130 may include a dedicated processing unit designed to perform a specific function, such as, for example, a graphics processing unit (GPU), a physics processing unit (PPU), a digital signal processor (DSP), or another type of specialized processing unit. Main memory 320 may include a random access memory (RAM) or another type of dynamic storage device that may store information and instructions for execution by processor 125 and/or specialized processing unit 130. ROM 330 may include a ROM device or another type of static storage device that may store static information and instructions for use by processor 125 and/or specialized processing unit 130. Storage device 340 may include a magnetic and/or optical recording medium and its corresponding drive.

Input device 350 may include a mechanism that permits an operator to input information to device 300, such as a keyboard, a mouse, a pen, voice recognition and/or biometric mechanisms, etc. Output device 360 may include a mechanism that outputs information to the operator, including a display, a printer, a speaker, etc. Communication interface 370 may include any transceiver-like mechanism that enables device 300 to communicate with other devices and/or systems. For example, communication interface 370 may include mechanisms for communicating with another device or system via a network, such as network(s) 230.

Device 300, consistent with the embodiments described herein, may perform certain operations or processes, as will be described in detail below. Device 300 may perform these operations in response to processor 125 and/or specialized processing unit 130 executing software instructions contained in a computer-readable medium, such as memory 320. A computer-readable medium may be defined as a physical or logical memory device.

The software instructions may be read into memory 320 from another computer-readable medium, such as data storage device 340, or from another device via communication interface 370. The software instructions contained in memory 320 may cause processor 125 and/or specialized processing unit 130 to perform operations or processes that will be described later. Alternatively, hardwired circuitry may be used in place of or in combination with software instructions to implement embodiments described herein. Thus, implementations described herein are not limited to any specific combination of hardware circuitry and software.

Although FIG. 3 shows example components of device 300, in some implementations, device 300 may include fewer, different, or additional components than those depicted in FIG. 3.

Exemplary Client Functional Diagram

Figure 4:
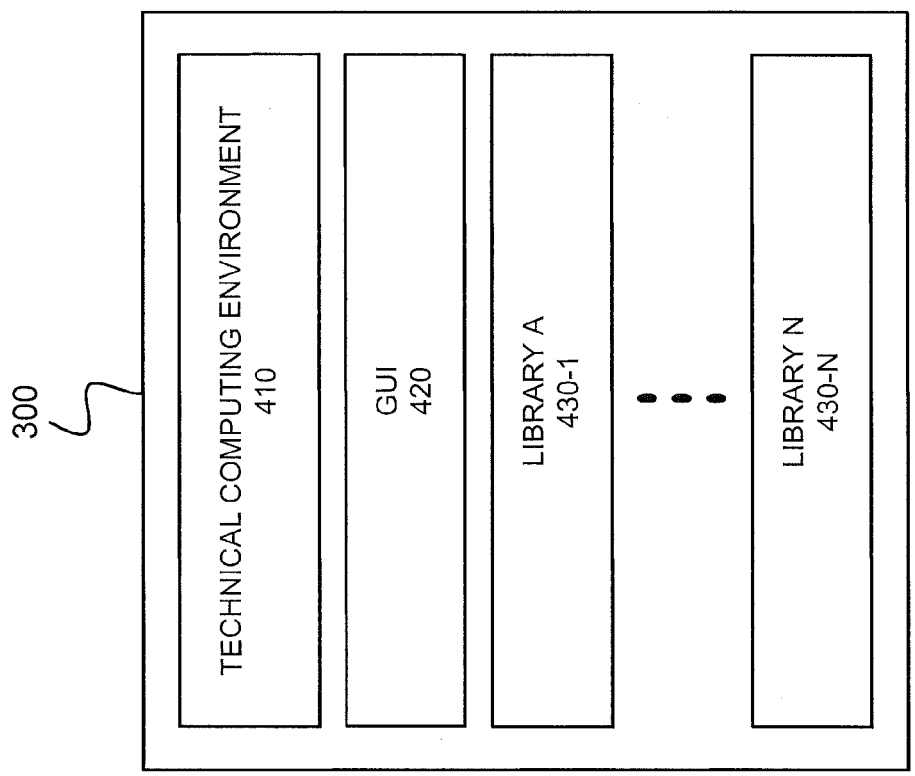
FIG. 4 is an exemplary functional block diagram of the device.

FIG. 4 is an exemplary functional diagram of device 300. The diagram of FIG. 4 depicts functional components that may be implemented by processor 125, or in the case of data or objects, implemented in memory 320, ROM 330 or storage device 340. As depicted in FIG. 4, at a functional level, device 300 may include a technical computing environment (TCE) 410, a graphical user interface (GUI) 420, and libraries A 430-1 through N 430-N.

TCE 410 may include any hardware and/or software based logic that provides a computing environment that allows users to perform tasks related to disciplines, such as, but not limited to, mathematics, science, engineering, medicine, business, etc. In one implementation, TCE 410 may include a dynamically-typed programming language (e.g., the M language) that can be used to express problems and/or solutions in mathematical notations. For example, one or more languages provided in TCE 410 may use an array as a basic element, where the array may not require dimensioning. TCE 410 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 410 may further provide mathematical functions and/or graphical tools (e.g., for creating plots, surfaces, images, volumetric representations, etc.). In one implementation, TCE 410 may provide these functions and/or tools using toolboxes (e.g., toolboxes for signal processing, image processing, data plotting, parallel programming, etc.). In another implementation, TCE 410 may provide these functions as block sets. In still another implementation, TCE 410 may provide these functions in another way, such as via a library, etc.

TCE 410 may be implemented as a text-based environment (e.g., MATLAB® from "The Mathworks"); Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; Ptolemy from the University of California at Berkeley; etc.), a graphically-based environment (e.g., Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; aspects of a Unified Modeling Language (UML) or SysML environment; etc.), or another type of environment, such as a hybrid environment that includes one or more of the above-referenced text-based environments and one or more of the above-referenced graphically-based environments.

GUI 420 may include any type of graphical interface that may receive user input and may cause one or more graphics to be rendered for display. For example, GUI 420 may receive user input that selects a type of graphics to be displayed, and the parameters of the graphics, and subsequently cause the graphics to be displayed.

Library A 430-1 may include a library of objects, and associated data, that may be used for constructing an object tree or acyclic graph that, for example, describes a graphical scene. In other implementations, a toolbox may be used instead of, or in addition to, library A 430-1. Library A 430-1 may be accessed to retrieve appropriate objects, based on user input, which can be assembled in the object tree for describing the graphical scene. Various different objects may be stored in library A 430-1 depending on the type of processing algorithm 105 being implemented. If the processing algorithm (e.g., processing algorithm 105) includes a graphics processing algorithm, examples of objects that may be contained in library A 430-1 include (but are not limited to) an "axes" object, a "dataspace" object, a "surface" object, a "ruler" object, a "line" object, a "quadrilateral" object and a "text" object. The "axes" object includes a composite object that groups together a number of simpler objects to provide a better user interface. When an "axes" object is created, one or more additional simpler objects are created including (but not limited to), for example, a "dataspace" object, a "colorspace" object, one or more "ruler" objects, a "box" object and/or a "clipnode" object. These simpler objects may be called "child objects" and the "axes" object may set at least a portion of the properties of these child objects. The properties of the "axes" object, thus, may "pass through" to the properties of the child objects. The "dataspace" object may include properties that control the mapping of data values associated with a graphical scene to coordinates and/or colors. The "surface" object may include properties that control how the "surface" object's peer object in the graphics rendering tree generates a visual representation of a function over a two dimensional parametric domain. The "surface" object may have three properties named "XData," "YData," and "ZData." The "XData" property may specify the X coordinates of columns of the parametric space. The "YData" may specify the Y coordinates of columns of the parametric space. The "XData" and "YData" may include one dimensional vectors with M values in the "YData" and N values in the "XData." The "ZData" property may define the Z coordinates of the space and may include a two dimensional array with dimensions M×N. The "ruler" object may include properties that control how the "ruler" object's peer object in the graphics rendering tree draws tick marks and labels for one axis of the "Axes" object. The "axes" object may create one ruler for the X axis, another for the Y axis, and another one for the Z axis. The "ruler" object may create two child objects. One of the two child objects may include the "line" object that may include properties that control how the "line" object's peer object in the graphics rendering tree draws the tick marks. The other of the two child objects may include the "text" object that may include properties that control how the "text" object's peer object in the graphics rendering tree draws the labels. The "line" object may further include properties that control how the "line" object's peer object in the graphics rendering tree renders one or more continuous or disjoint line segments. The "quadrilateral" object may include properties that control how the "quadrilateral" object's peer object in the graphics rendering tree draws three dimensional coordinates and fills the interior of a bounding quadrilateral. The "quadrilateral" object may also control how the "quadrilateral" object's peer object in the graphics rendering tree fills the interior of a bounding quadrilateral with a solid color, may interpolate four input colors, or may perform lighting calculations. The "text" object may include functionality for drawings characters to the screen in the graphical scene.

Library N 430-N may include another library of objects, and associated data, that may be used for constructing a peer object tree, such as, for example, graphics rendering tree 110, that may be used by a GPU for rendering the graphical scene described by the object tree. In other implementations, a toolbox may be used instead of, or in addition to, library N 430-N. Library N 430-N may be accessed to retrieve appropriate objects, based on the contents of the corresponding object tree, which can be assembled in the graphics rendering object tree for use by the GPU. Various different objects may be stored in library N 430-N depending on the type of processing algorithm 105 being implemented. The contents of library N 430-N may be changed due to, for example, changing performance characteristics of the specialized processing unit (e.g., the GPU). In other implementations, another library may be "ported" to enable the use of different objects in the peer object tree (e.g., graphics rendering tree). If the processing algorithm includes a graphics processing algorithm, examples of objects that may be contained in library N 430-N include (but are not limited to) a "viewport" object, a "camera" object, a "group" object and a "geode" object.

A "viewport" object may include functionality for controlling the size and position of the window in which the graphical scene is rendered. A "camera" object may include functionality for transforming a given coordinate system to the rendering system coordinates. For example, a "camera" object may define a mapping from three dimensional world coordinates to two dimensional coordinates within the current viewport. A "group" object may act as a placeholder so that the structure of the object tree and peer object tree match. A "geode" object may include functionality for causing aspects of the graphical scene to be drawn (e.g., points, lines, triangles or quadrilaterals).

Although FIG. 4 shows example functional components of device 300, in some implementations, device 300 may include fewer, different or additional functional components than those depicted in FIG. 4.

Exemplary Tree Creation Process

Figure 5:
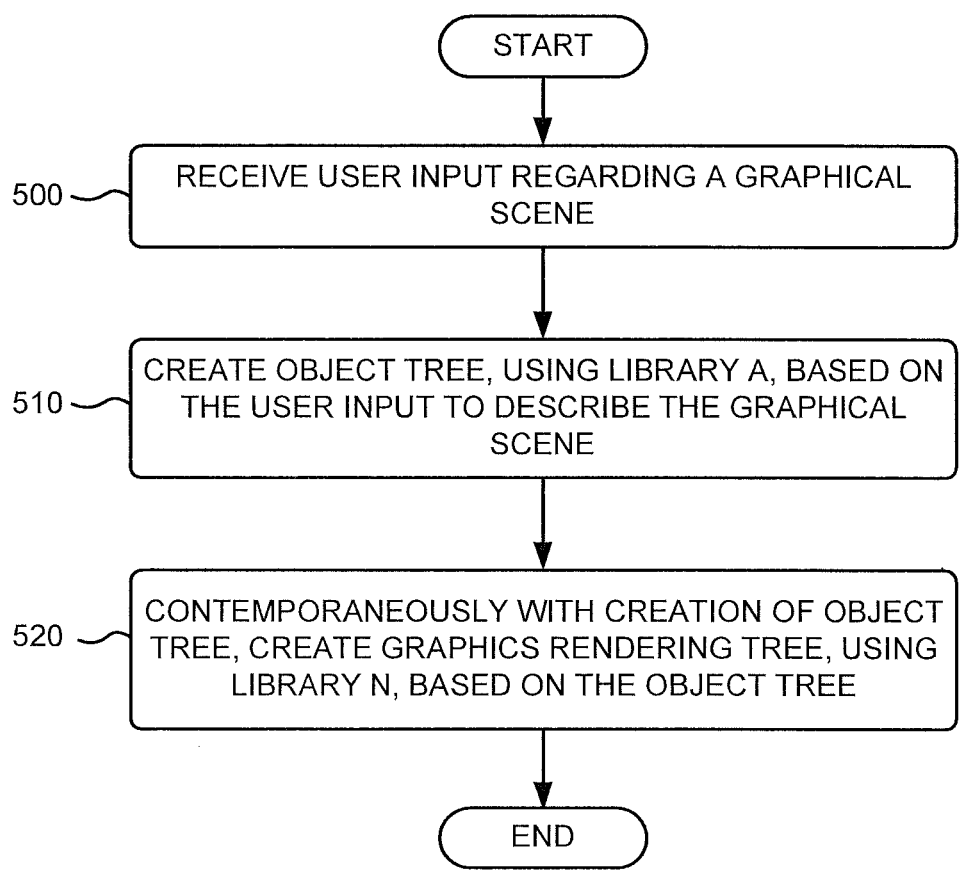
FIG. 5 is a flowchart of an exemplary process for creating object trees for use in describing a graphical scene and for rendering the graphical scene via a GPU.

FIG. 5 is a flowchart of an exemplary process for creating object trees for use in describing a graphical scene and for rendering the graphical scene via a GPU. In one implementation, the process exemplified by FIG. 5 may be performed by processor 125 of a client 210. In another implementation, the process exemplified by FIG. 5 may be performed by processor 125 of server 220. In a further implementation, blocks 500 and 510 of FIG. 5 may be performed by processor 125 of a client 210 and block 520 may be performed by processor 125 of server 220.

Figure 6:
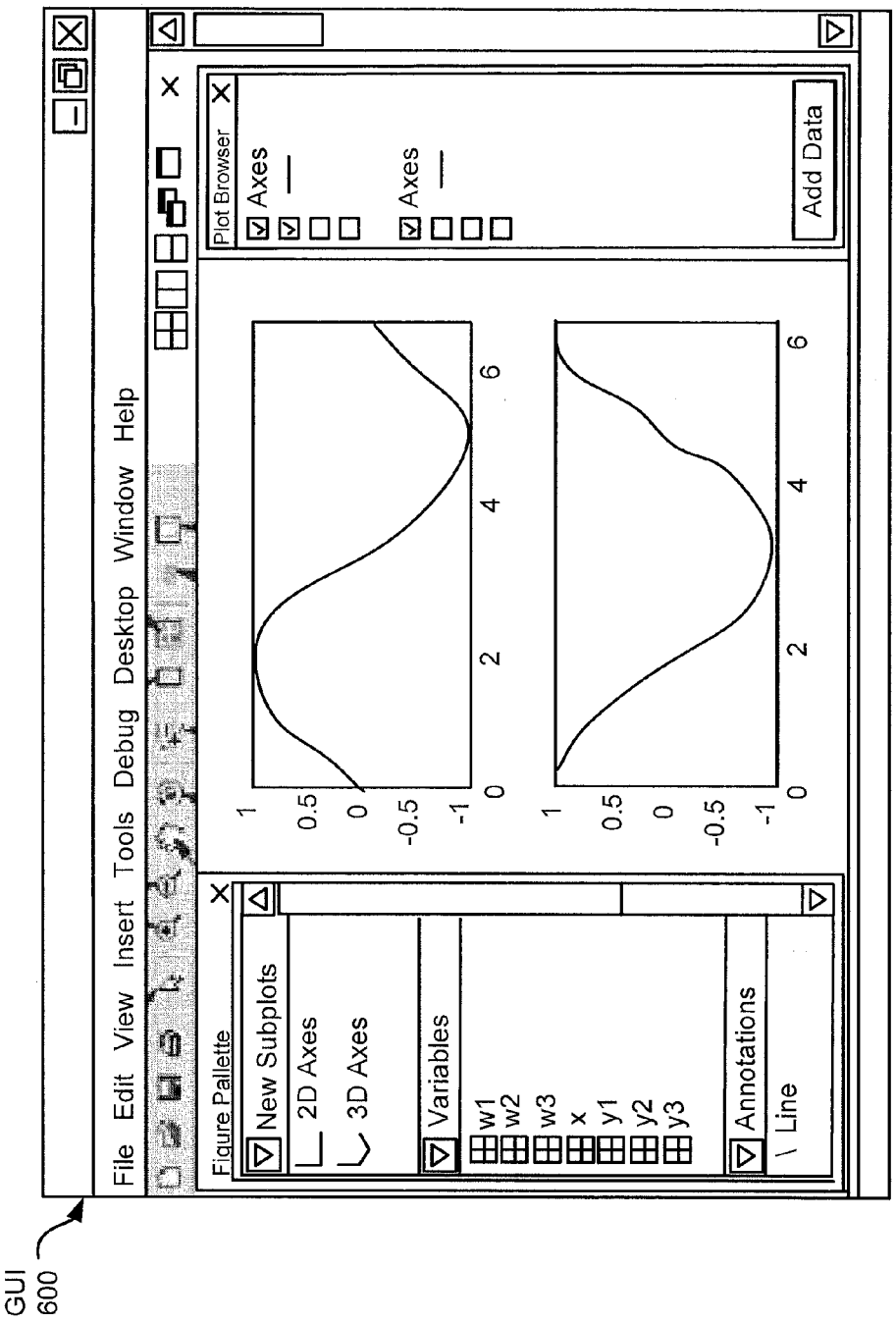
FIG. 6 is a diagram of an exemplary graphical user interface that may be implemented at a client.

The exemplary process may begin with the receipt of user input regarding a graphical scene (block 500). The user input may specify a type of graphical scene that is to be rendered, including parameters associated with the graphical scene. For example, the graphical scene may be a three dimensional graph and the parameters may include x, y and z values that are to be plotted in the three dimensional graph. The user may, for example, use a graphical user interface (GUI) at client 210 to enter the user data for specifying the graphical scene. FIG. 6 illustrates an exemplary GUI 600 that a user may use to enter data for specifying the graphical scene. GUI 600 may be displayed by browser 215. The GUI, similar to GUI 600 shown in FIG. 6, may include various fields, windows, or data entry portions that permit the user to enter the input regarding the graphical scene. The GUI may include fields, windows or data entry portions for entering or identifying graphical scene parameters, labels, etc.

Figure 7:
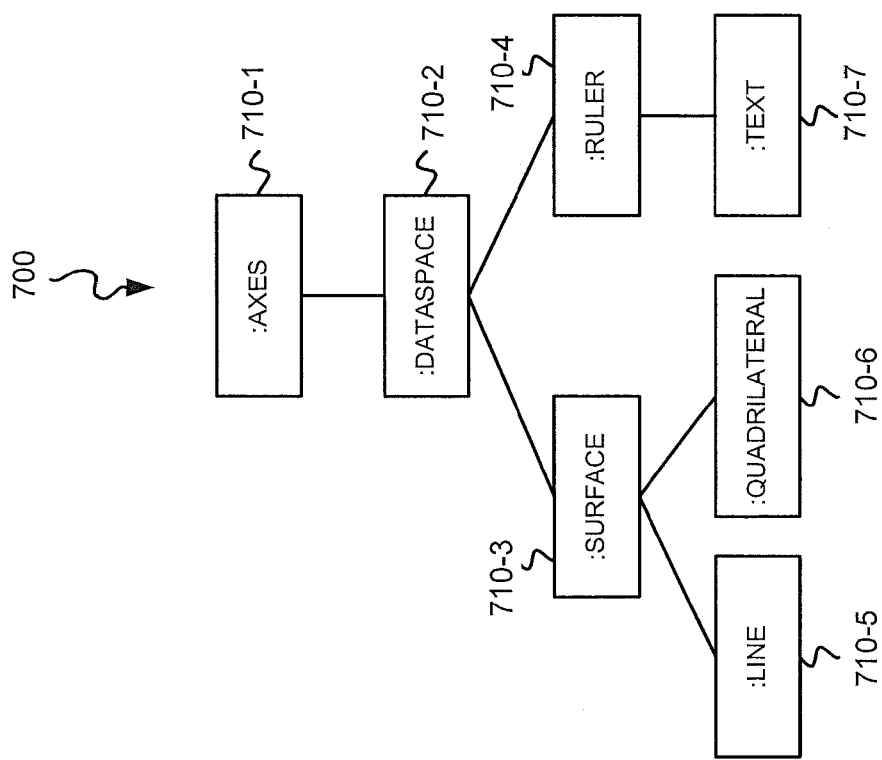
FIG. 7 is a diagram of an exemplary object tree that describes a graphical scene.

An object tree may be created, using library A 430-1, based on the user input to describe the graphical scene (block 510). Library A 430-1 may be used to retrieve appropriate objects to describe the graphical scene specified by the user, with properties of the retrieved objects being set based on the parameters provided by the user. FIG. 7 illustrates an object tree 700 of one exemplary embodiment that includes objects 710-1 through 710-7 (collectively referred to herein as "objects 710") linked together in a tree structure. When object tree 700 is created, data associated with objects 710 of object tree 700 may be in a format used by the processing algorithm, but not in a format that provides a certain performance (e.g., best performance) from the GPU.

Figure 8:
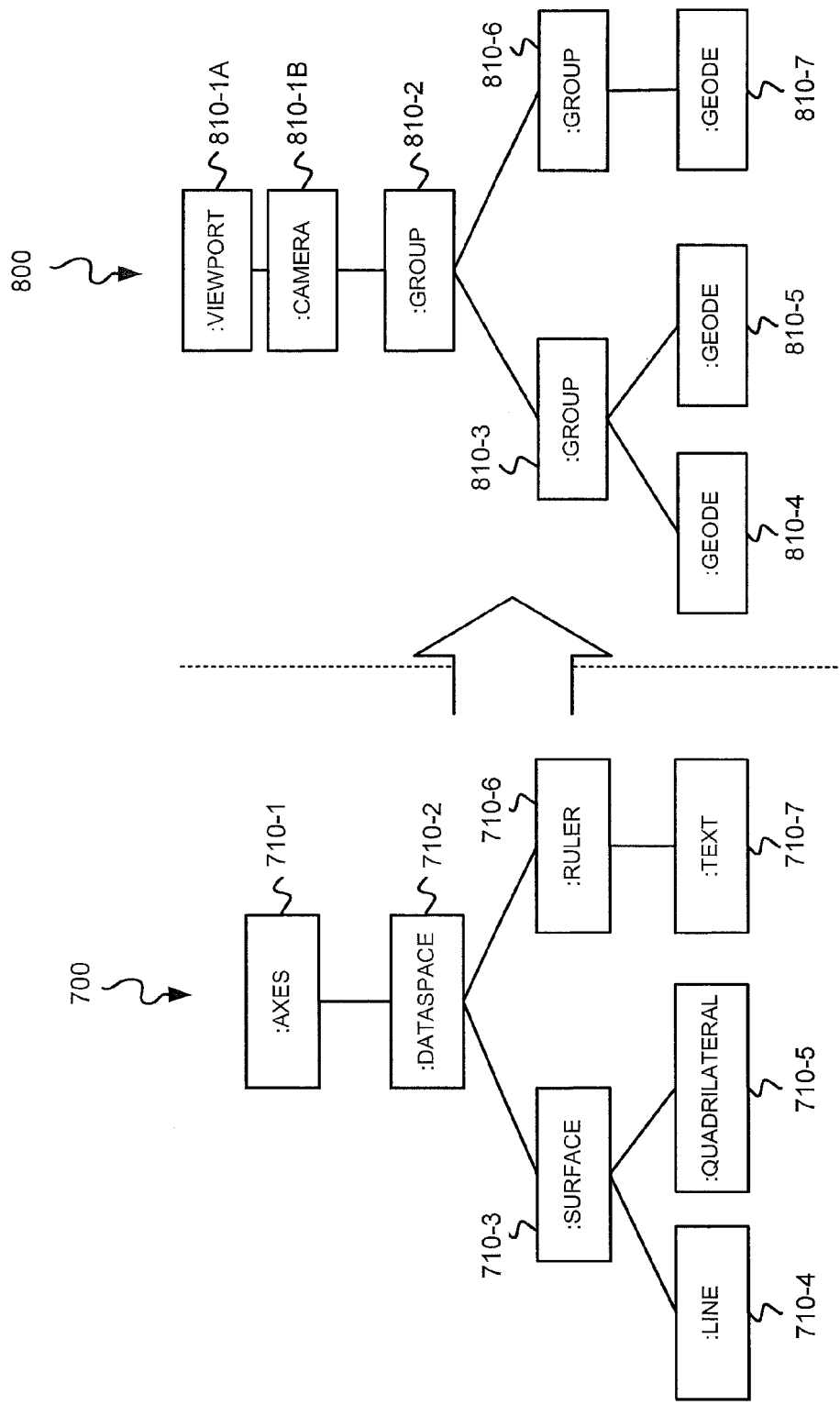
FIG. 8 is a diagram that depicts the creation of a graphics rendering tree from the object tree of FIG. 7.

Exemplary embodiments may create another structure, e.g., a tree, contemporaneously with object tree 700, where the created structure is optimized for a certain performance (e.g., best performance) from the GPU. For example, a graphics rendering tree may be created, contemporaneously with the creation of the object tree, using library N 430-N, based on the object tree (block 520). Each object in the object tree (e.g., objects 710-1 through 710-7) may have one or more corresponding graphics rendering objects (e.g., graphics rendering objects 810-1A through 810-7) that may be retrieved from library N 430-N. Each corresponding graphics rendering object may be optimized to provide the certain performance (e.g., best performance) from the GPU. For example, data associated with each graphics rendering object may be converted to a format that provides the certain performance (e.g., best performance) from the GPU. The properties of each graphics rendering object may be set based on the user input and/or based on data associated with the object tree. Each of the graphics rendering objects may be linked together to form a graphics rendering tree. FIG. 8 illustrates the creation of an exemplary graphics rendering tree 800 based on object tree 700. As shown in FIG. 8, each object 710 of object tree 700 has one or more corresponding objects 810 in graphics rendering tree 800.

Exemplary Graphics Rendering Tree Creation Process

Figure 9:
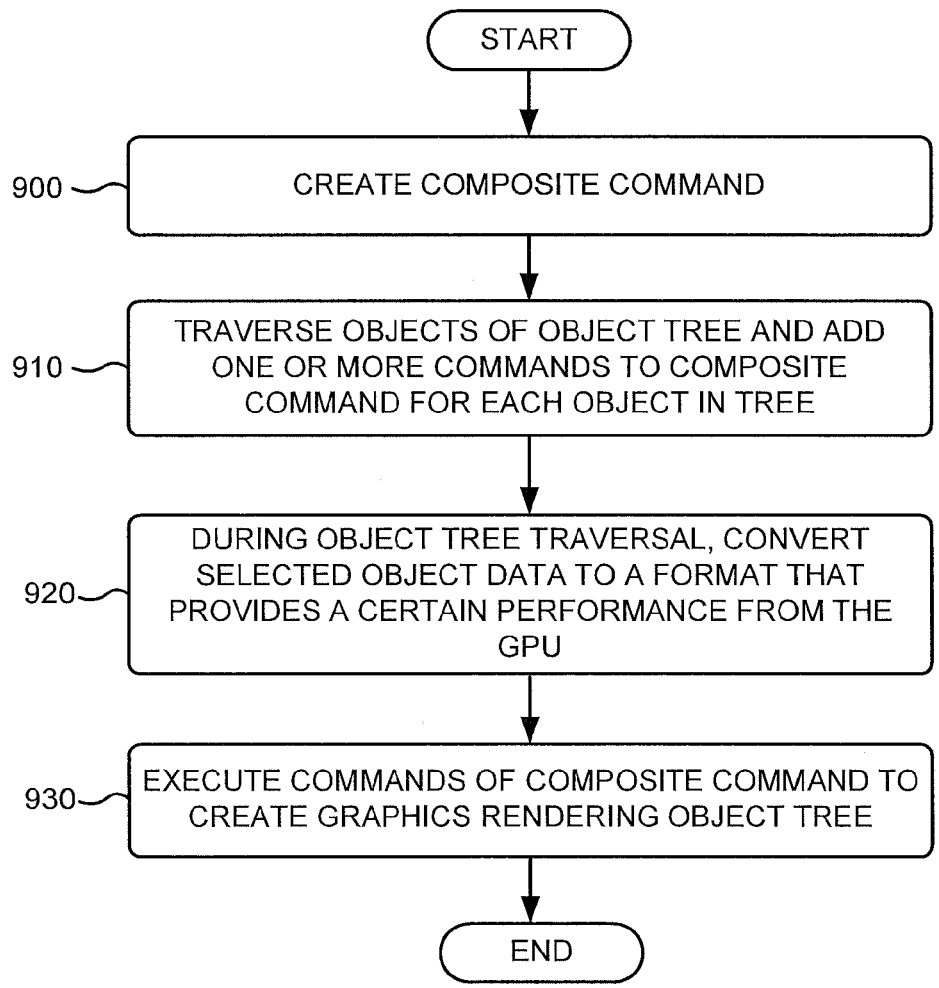
FIG. 9 is a flowchart of an exemplary process for creating a graphics rendering tree based on a corresponding object tree.

FIG. 9 is a flowchart of exemplary details for creating a graphics rendering tree based on a corresponding object tree. The exemplary process of FIG. 9 provides further details of the graphics rendering tree creation block (block 520) of FIG. 5. The process exemplified by FIG. 9 may be performed by either processor 125 of a client 210 or processor 125 of server 220.

Figure 10:
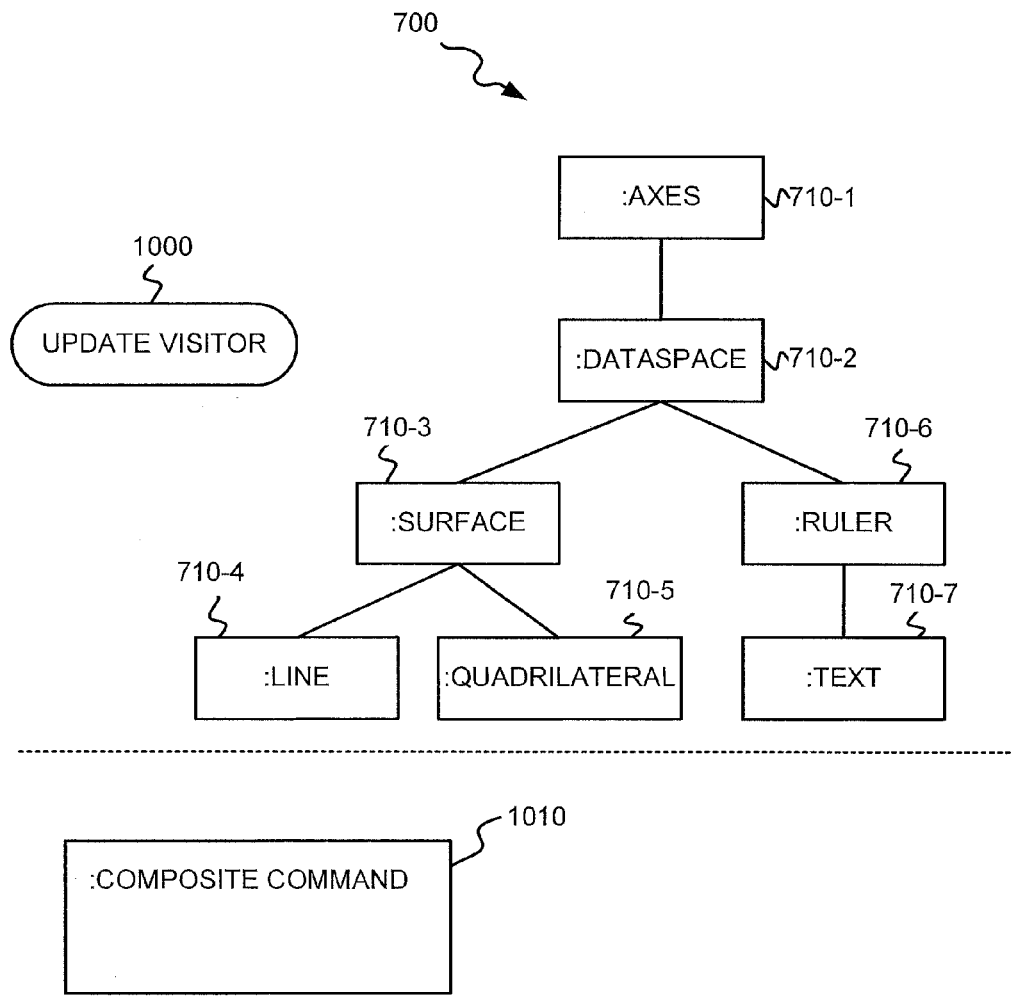
FIGS. 10-17 graphically depict an example of block 910 of FIG. 9.
Figure 11:
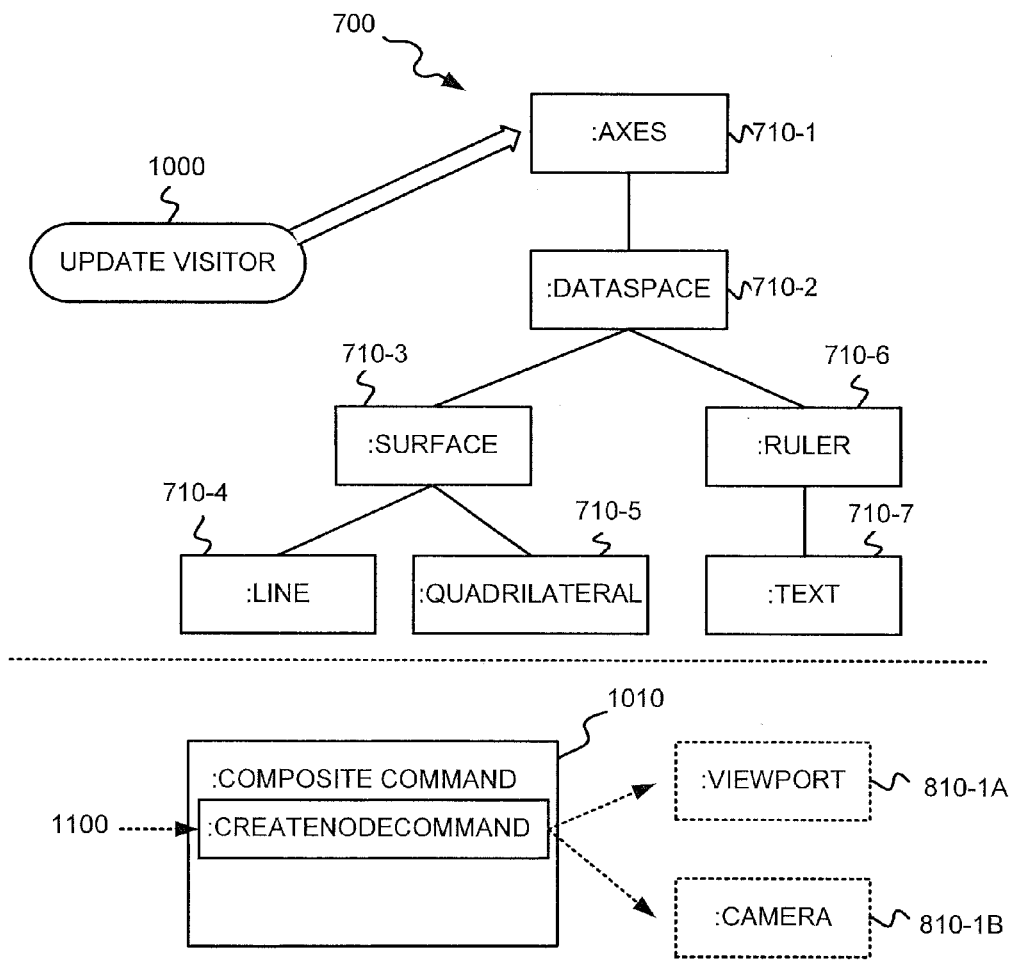

The exemplary process may begin with the creation of a composite command (block 900). As shown in FIG. 10, an update visitor 1000 may be created that further creates a composite command 1010 into which multiple commands may be inserted for creating the eventual graphics rendering tree. Update visitor 1000 may include a software entity that may traverse the object tree to add one or more commands to composite command 1010. The grouping of commands in composite command 1010 ensures that the graphics rendering tree has been completely created, and is not in an intermediate state of creation, in the case where processor 125 of client 210 or server 220 may be responding to events external to the creation of the graphics rendering tree. During creation of the graphics rendering tree, processor 125 may respond to events from other sources (e.g., requests to repaint the window from the operating system) and these could potentially be executed between any two commands. In between some of these commands, the graphics rendering tree is in an intermediate state, and the window should not be re-painted while the tree is in such a state. Grouping all of the commands for creating the graphics rendering tree into a single composite command ensures that requests from other sources are executed only at times in which the graphics rendering tree is in a valid state. Therefore, a composite command may include all of the commands that are needed to create the graphics rendering tree. In other implementations, multiple composite commands may be used in place of the single composite command. For example, one composite command may be used for creating a first set of objects in the graphics rendering tree and another composite command may be used for creating a second set of objects in the graphics rendering tree.

Figure 12:
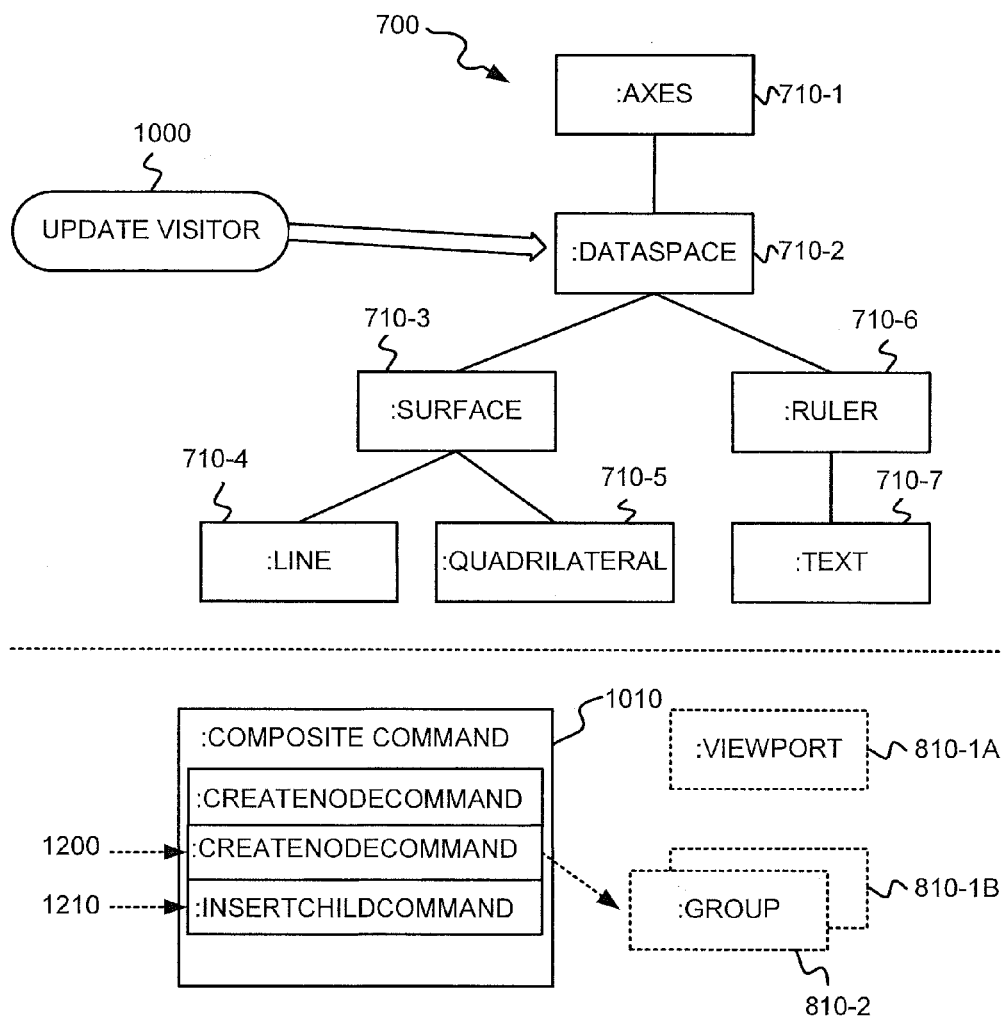

The objects of the object tree may be traversed and one or more commands may be added to the composite command for each object in the object tree (block 910). As illustrated in FIGS. 11-17, update visitor 1000 may visit each of objects 710-1 through 710-7 of object tree 700 and insert one or more appropriate commands into composite command 1010 that can be used to create the graphics rendering tree. The specific command or commands, and the content of the specific command or commands, for a given object of the object tree may be selected based on library N 430-N. As first shown in FIG. 11, update visitor 1000 may visit object 710-1 of object tree 700. Based on object 710-1 and library N 430-N, update visitor 1000 may insert a "create node command" 1100 into composite command 1010 which may be subsequently used to create objects 810-1A and 810-1B in the graphics rendering tree. FIG. 12 further illustrates update visitor 1000 visiting object 710-2 of object tree 700. Based on object 710-2, update visitor 1000 may insert another "create node command" 1200 into composite command 1010. Update visitor 1000 may additionally insert an "insert child command" 1210 into composite command 1010. The commands 1200 and 1210 may be subsequently used to create object 810-2 in the graphics rendering tree.

Figure 13:
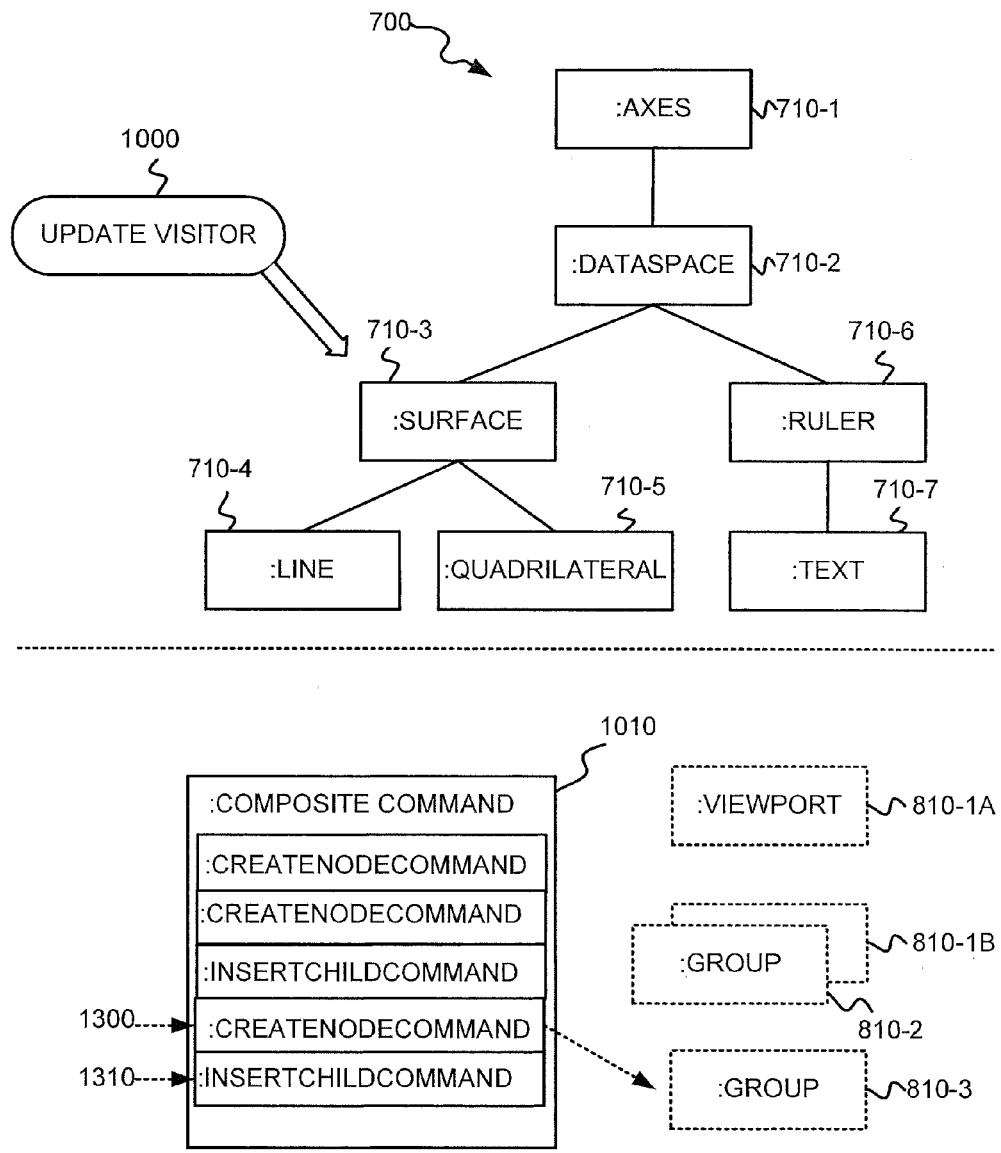
Figure 14:
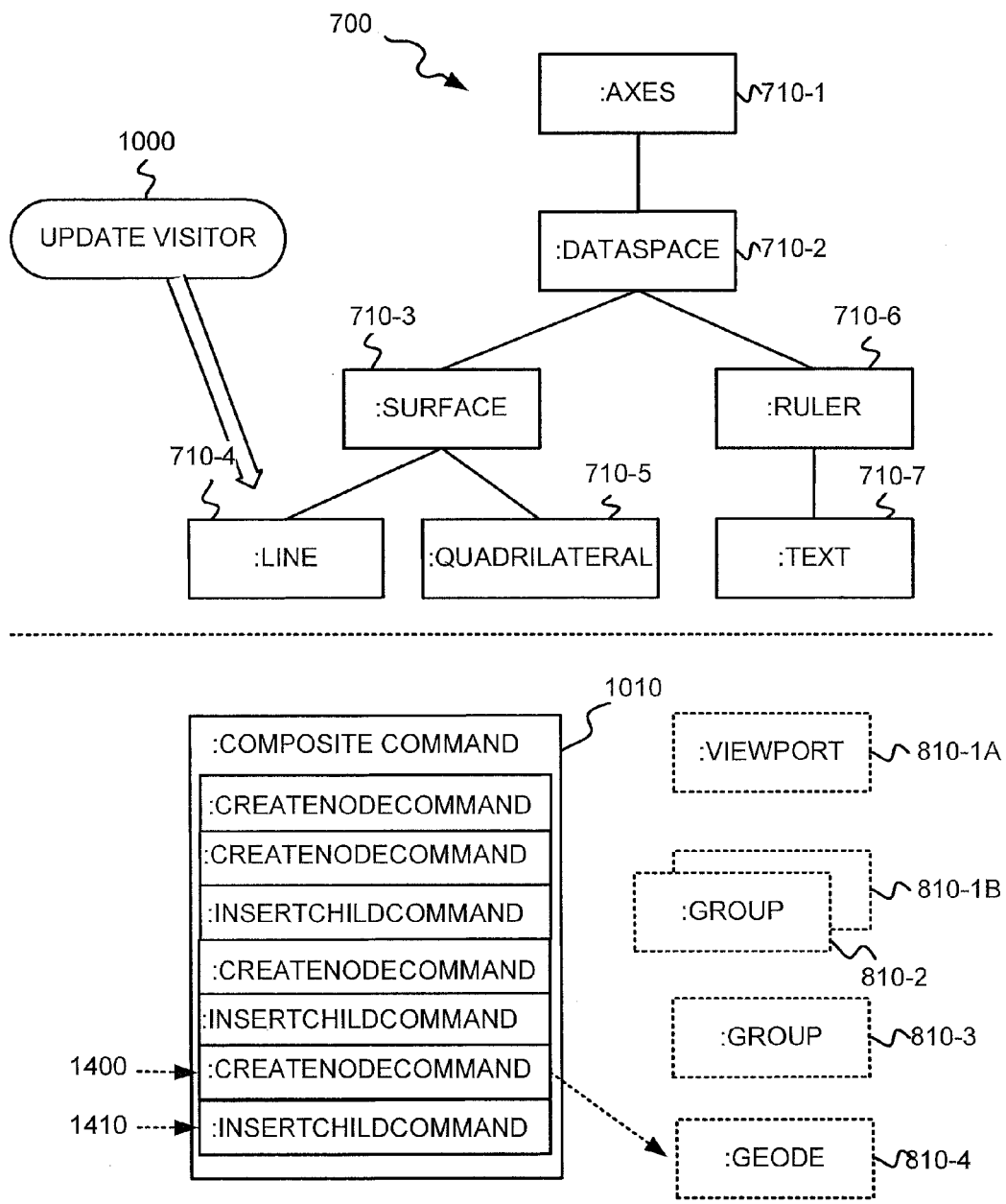
Figure 15:
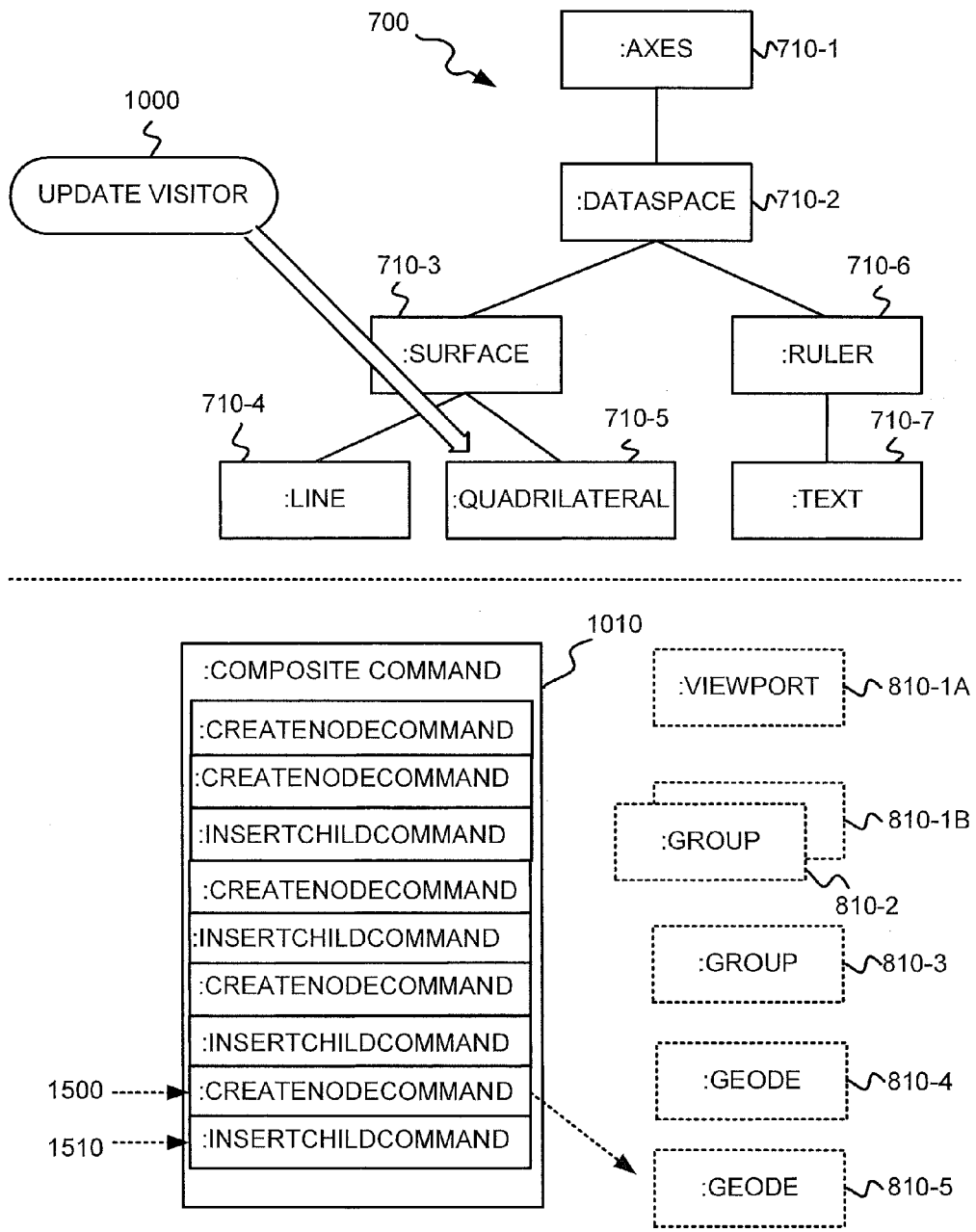

FIG. 13 illustrates update visitor 1000 visiting object 710-3 of object tree 700. Based on object 710-3, update visitor may insert another "create node command" 1300 and "insert child command" 1310 into composite command 1010. The commands 1300 and 1310 may be subsequently used to create object 810-3 in the graphics rendering tree. FIG. 14 illustrates update visitor 1000 visiting object 710-4 of object tree 700. Based on object 710-4, update visitor 1000 may insert another "create node command" 1400 and "insert child command" 1410 into composite command 1010. The commands 1400 and 1410 may be subsequently used to create object 810-4 in the graphics rendering tree. As further shown in FIG. 15, update visitor 1000 may visit object 710-5 of object tree 700. Based on object 710-5, update visitor 1000 may insert a "create node command" 1500 and "insert child command" 1510 into composite command 1010. The commands 1500 and 1510 may be subsequently used to create object 810-5 in the graphics rendering tree.

Figure 16:
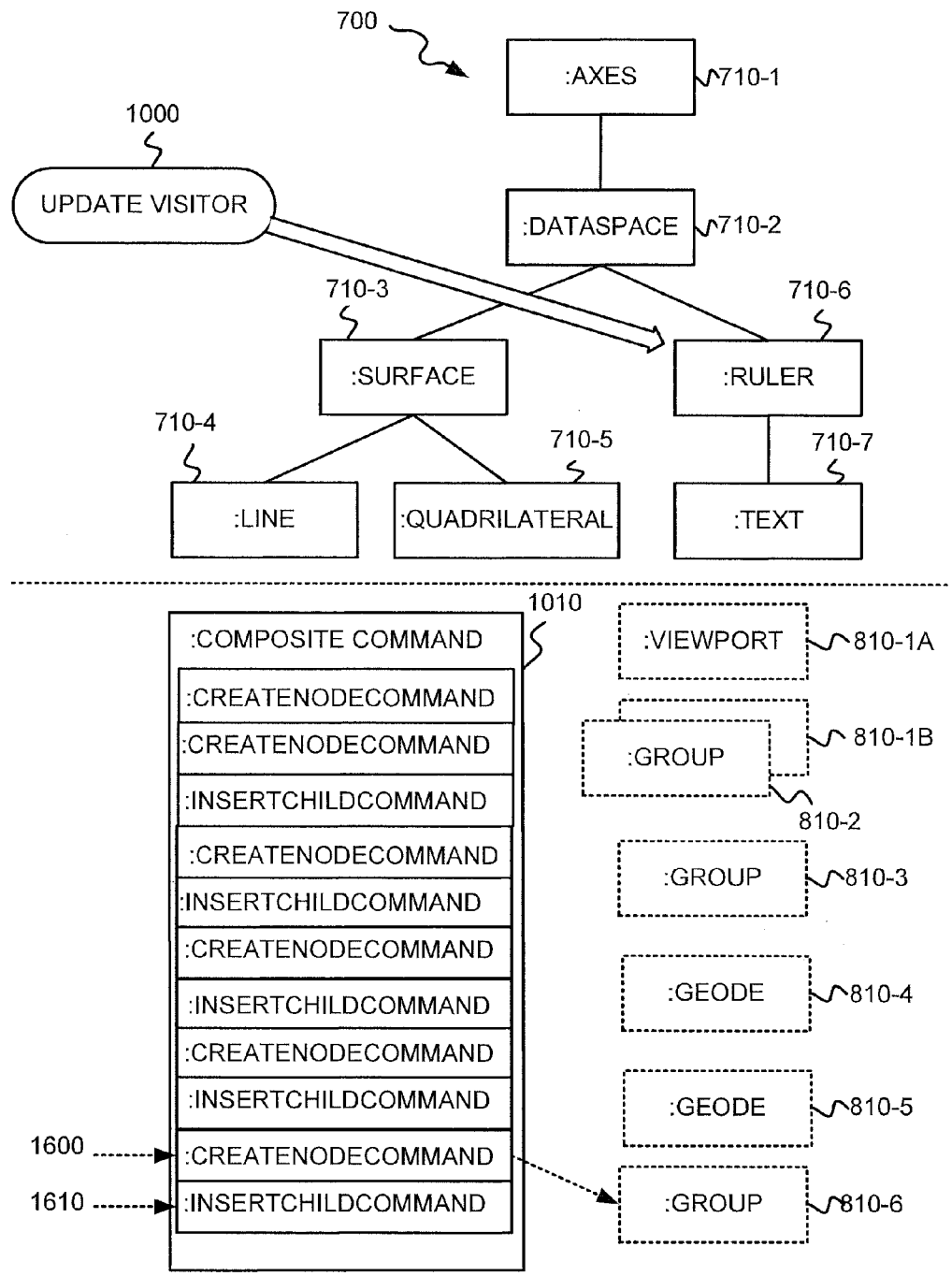
Figure 17:
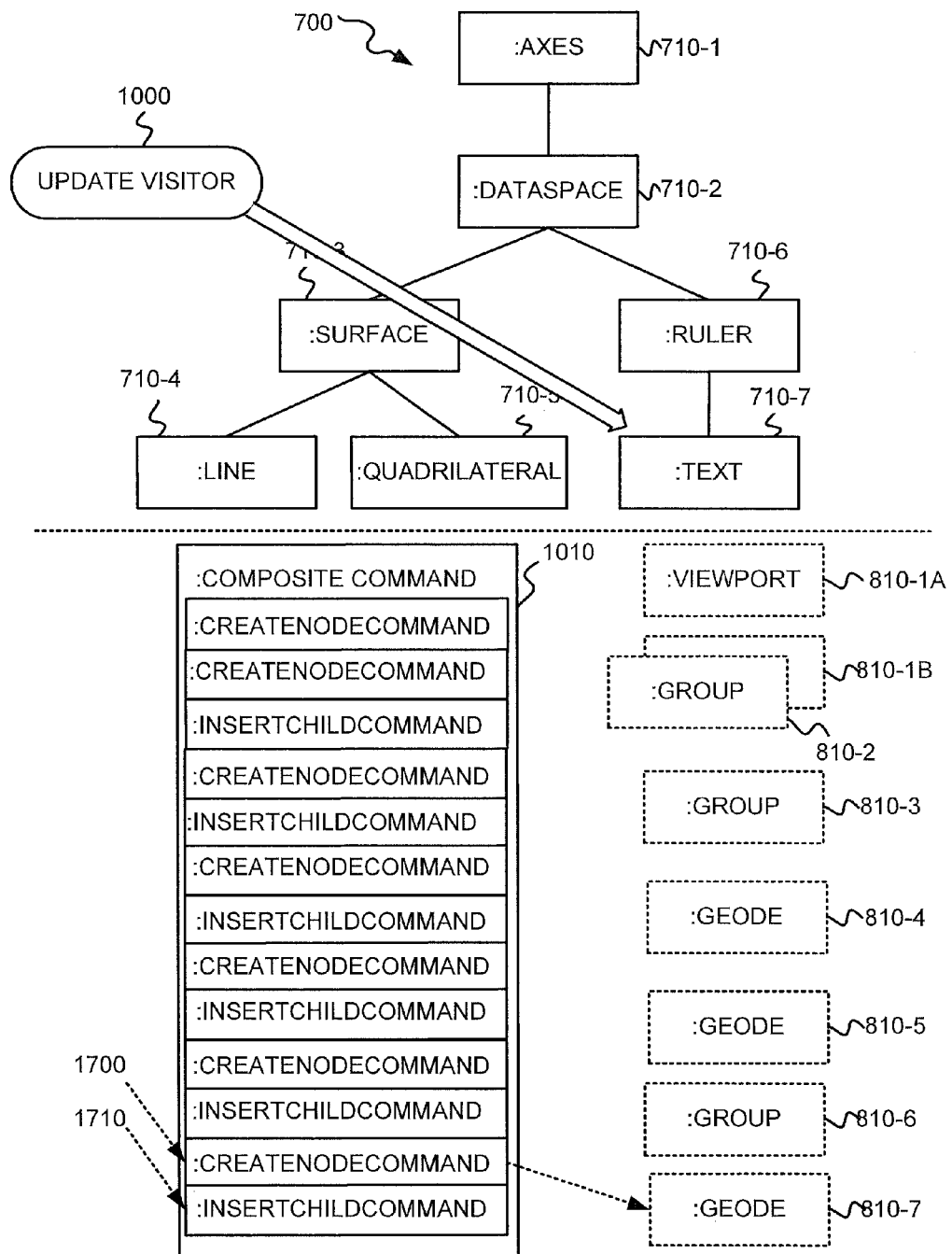

FIG. 16 illustrates update visitor 1000 visiting object 710-6 of object tree 700, which is the next to last object of object tree 700 to be traversed. Based on object 710-6, update visitor 1000 may insert another "create node command" 1600 and "insert child command" 1610 into composite command 1010. The commands 1600 and 1610 may subsequently be used to create object 810-6 in the graphics rendering tree. FIG. 17 additionally illustrates update visitor 1000 visiting object 710-7 of object tree 700. Based on object 710-7, update visitor 1000 may insert another "create node command" 1700 and "insert child command" 1710 into composite command 1010. The commands 1700 and 1710 may be subsequently used to create object 810-7 in the graphics rendering tree.

Figure 18A:
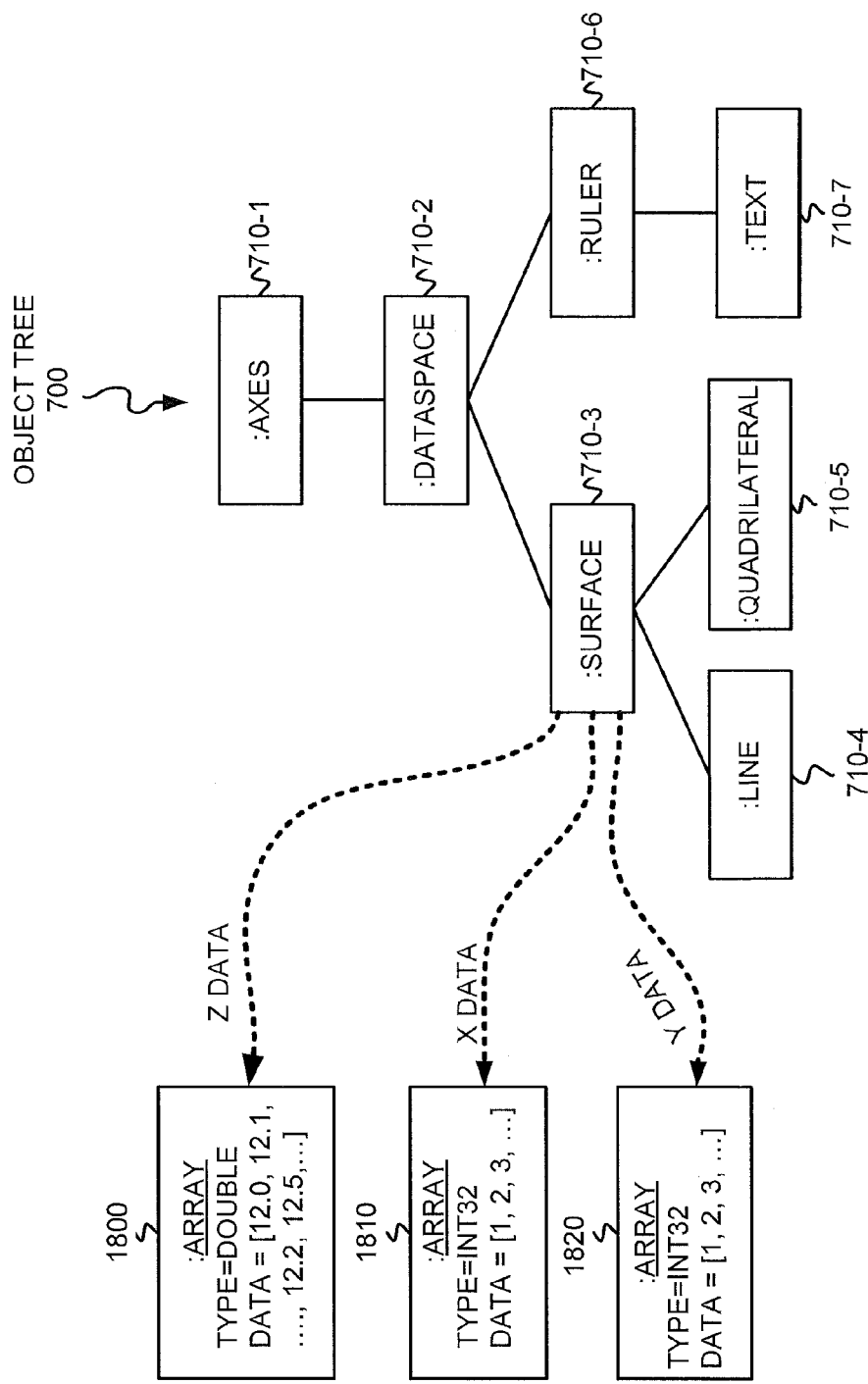
FIGS. 18A and 18B graphically depict an example of block 920 of FIG. 9.
Figure 18B:
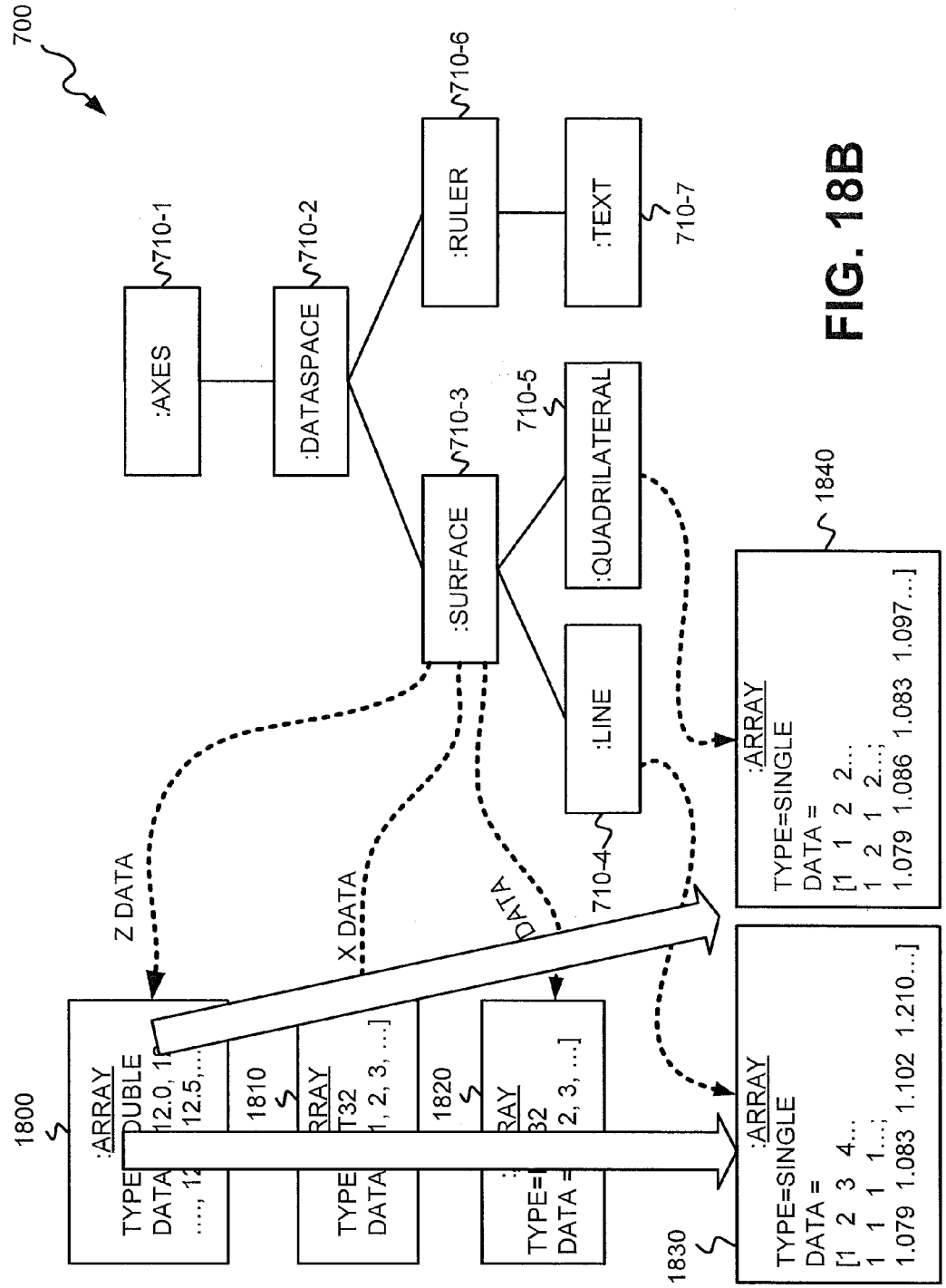

During object tree traversal, selected object data may be converted to a format that provides a certain performance from the GPU (block 920). In one embodiment, the certain performance may include a best performance. As an example, during traversal of object 710-3 of object tree 700 (shown in FIG. 13), data associated with object 710-3 may be converted from a first data format to a second data format that is optimized for use with a GPU. As shown in FIG. 18A, object 710-3 may include three arrays of data, Z data 1800, X data 1810 and Y data 1820 that represent object data points. As further depicted in FIG. 18A, Z data 1800 may include an array of double precision values, X data 1810 may include an array of 32 bit integer values and Y data 1820 may include an array of 32 bit integer values. As also shown in FIG. 18B, Z data 1800, X data 1810 and Y data 1820 may be converted to an array 1830 of single precision floating point numbers that may be set as values in object 710-4 and to an array 1840 of single precision floating point numbers that may be set as values in object 710-5. The exemplary data format conversion depicted in FIGS. 18A and 18B may be repeated for appropriate objects of object tree 700 to convert the data associated with those objects to a format that provides a certain performance (e.g., best performance) from the GPU.

Figure 19:
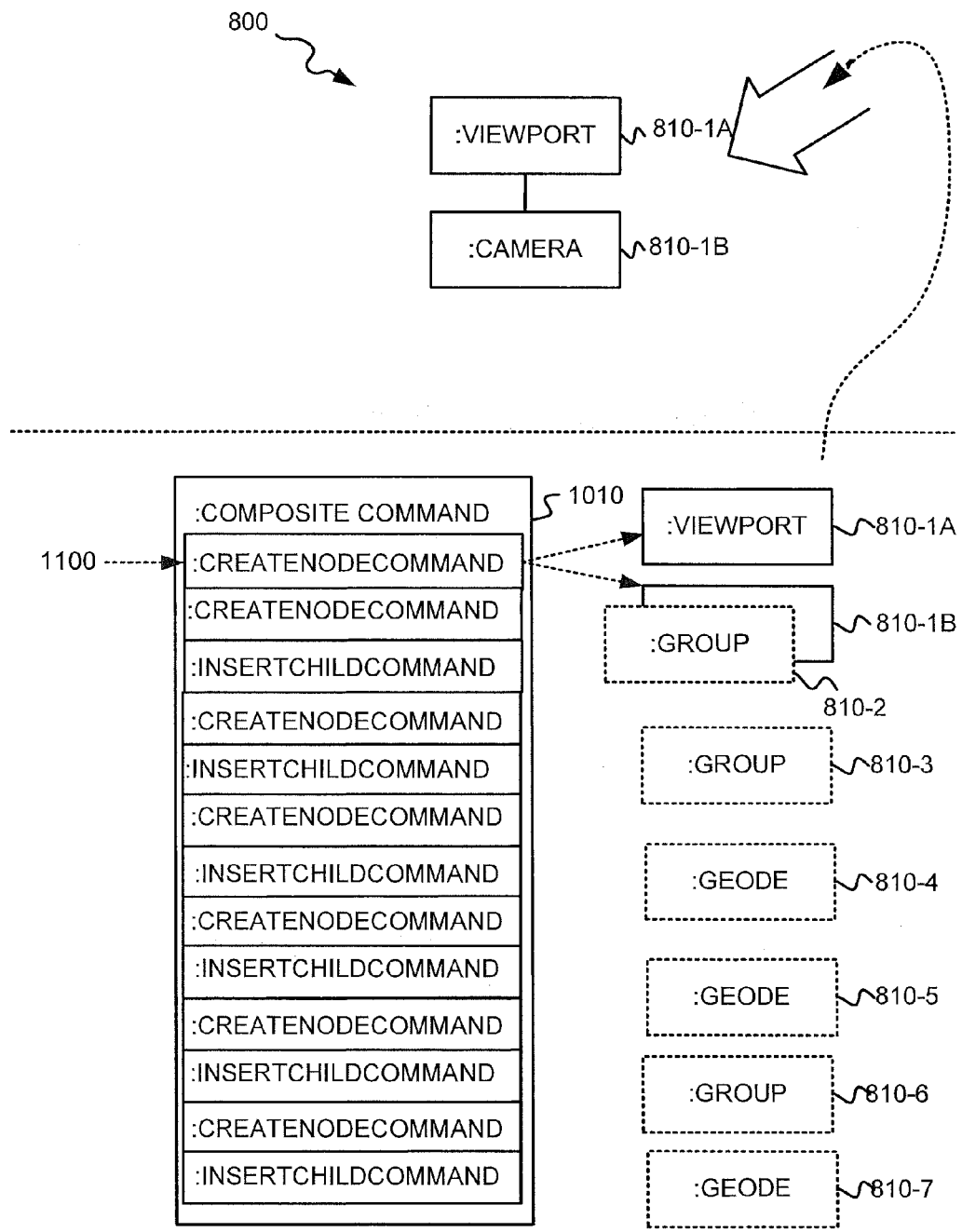
FIGS. 19-25 graphically depict an example of block 930 of FIG. 9.
Figure 20:
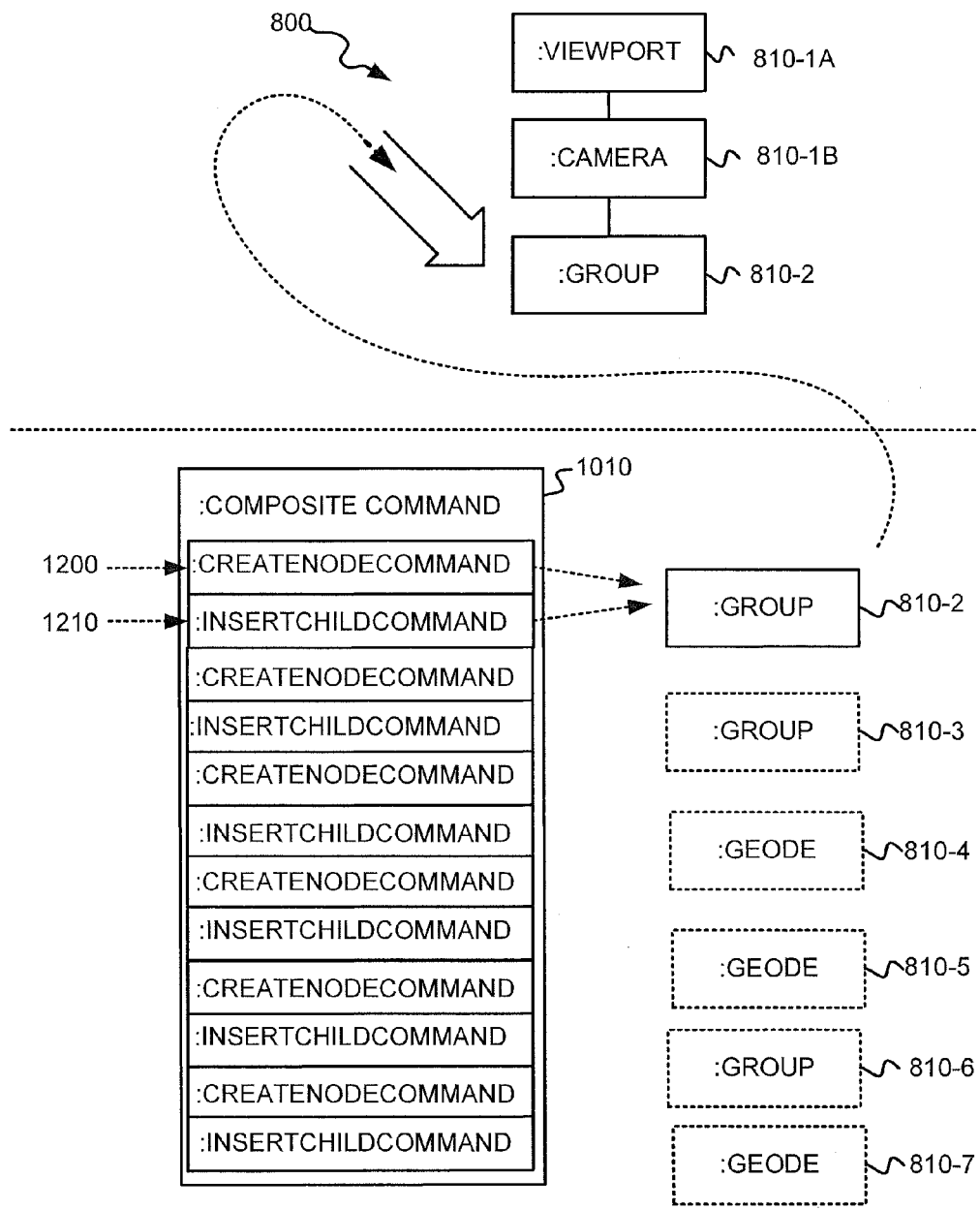
Figure 21:
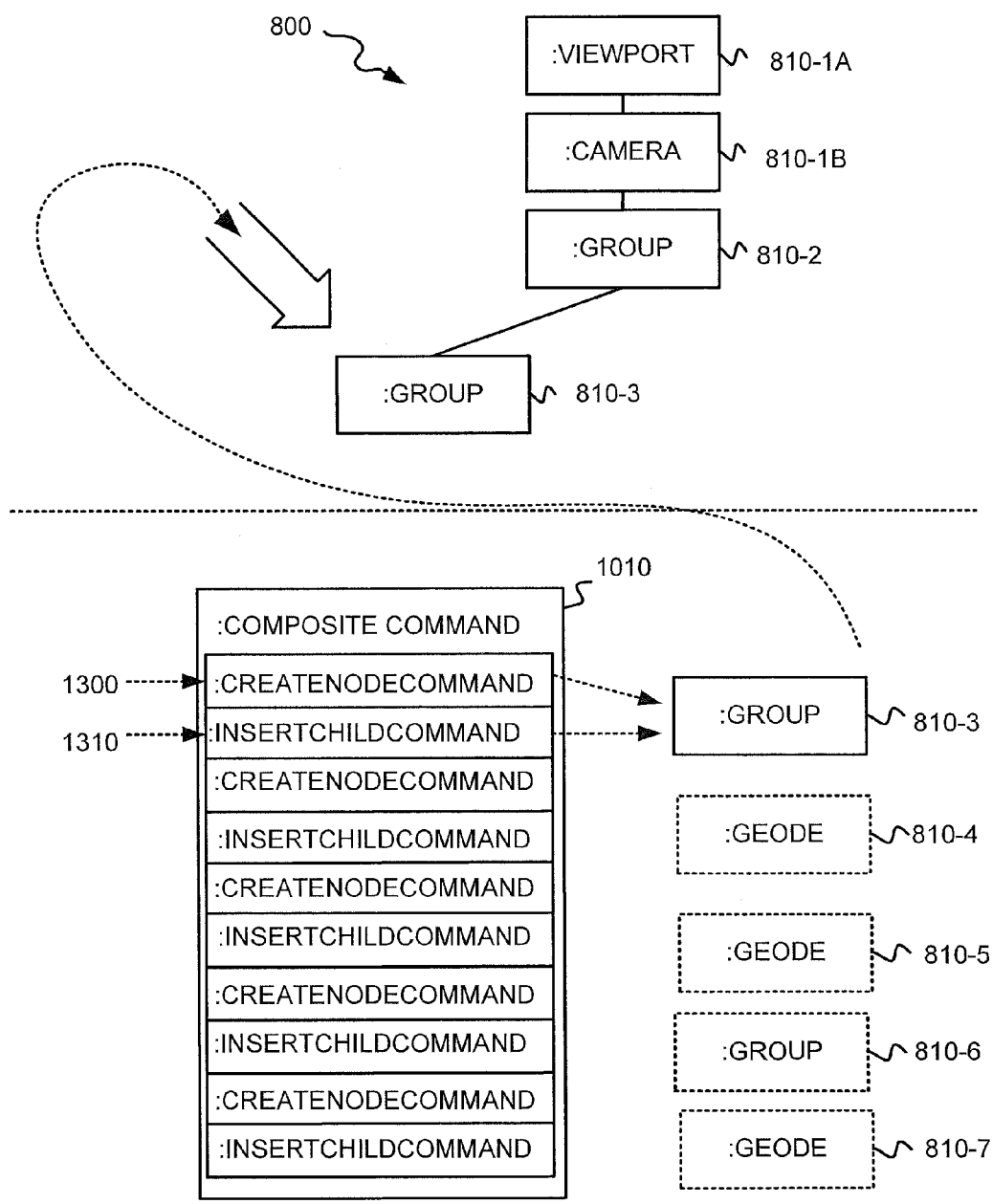
Figure 22:
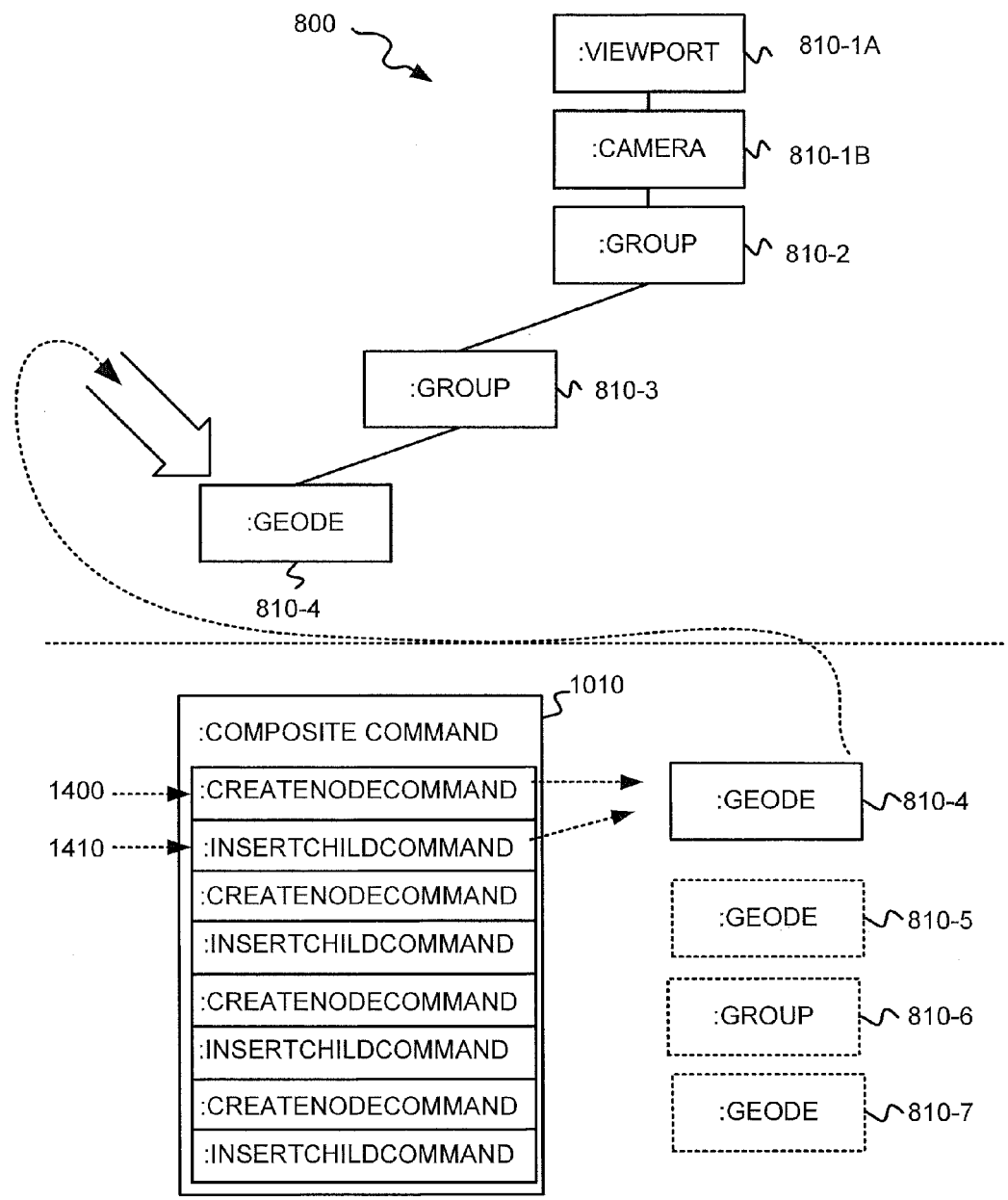
Figure 23:
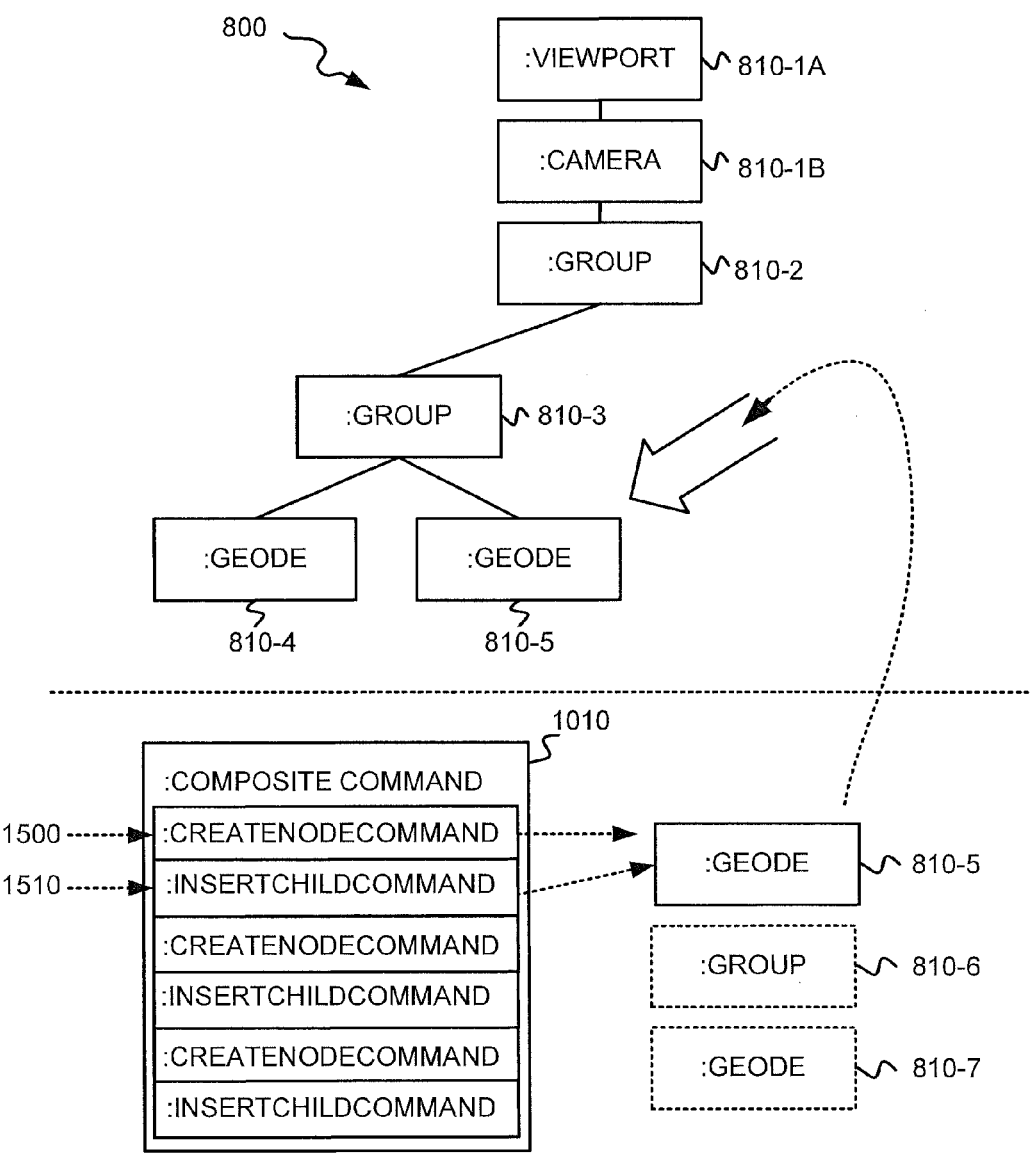
Figure 24:
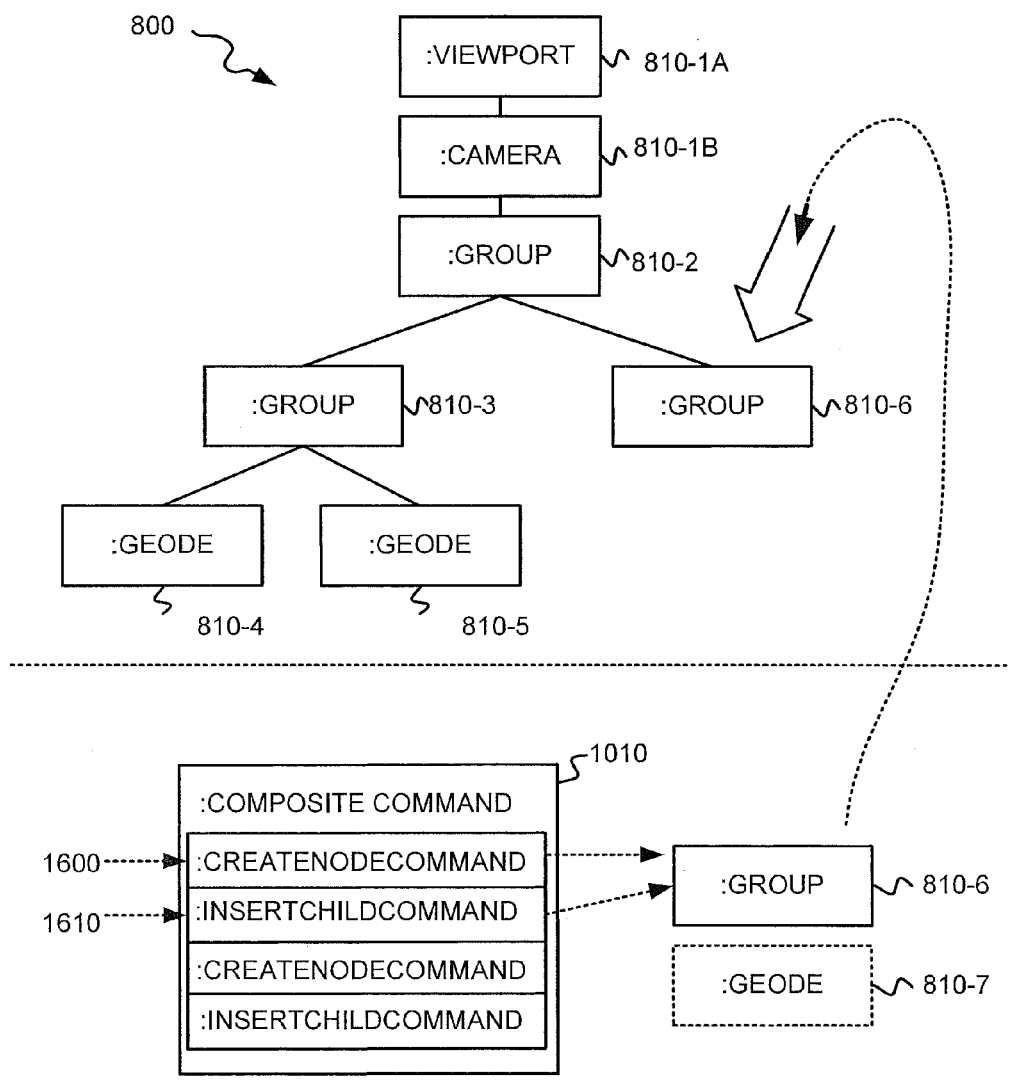
Figure 25:
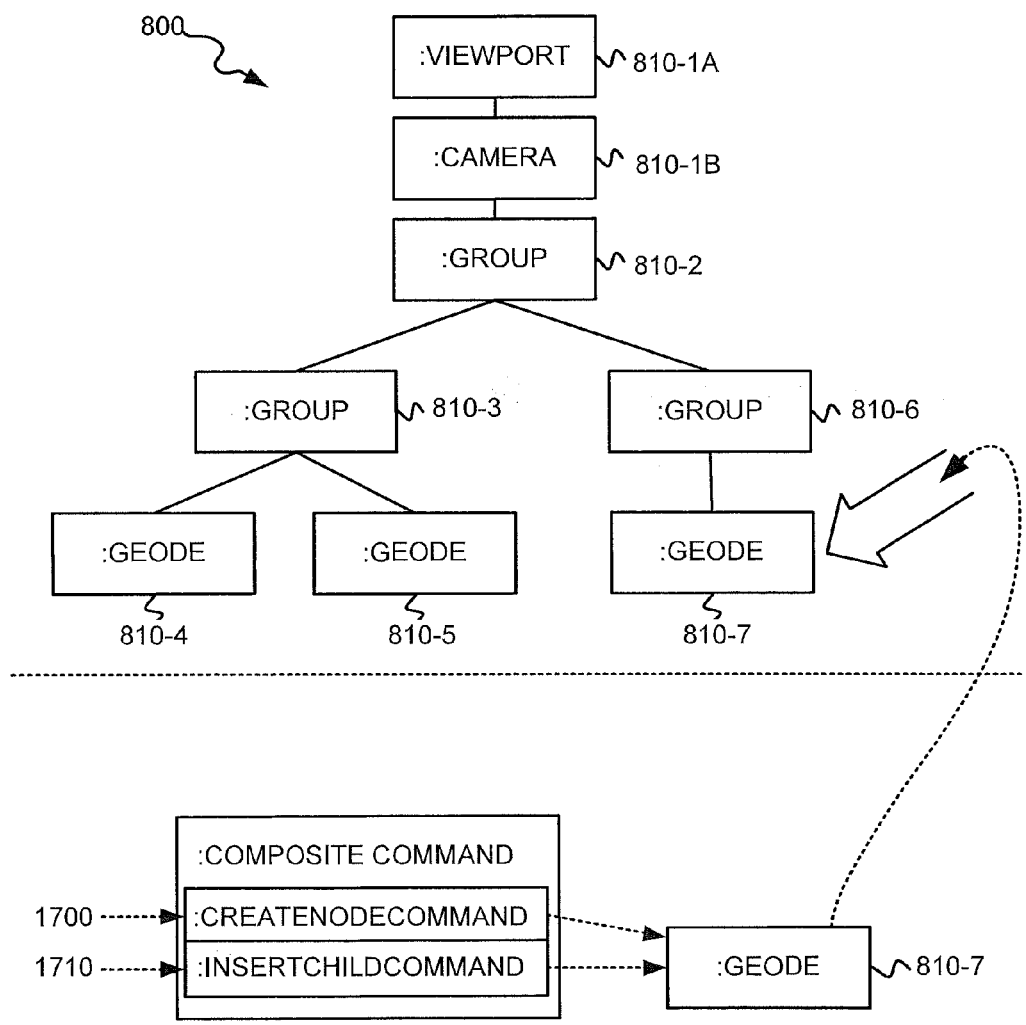

Upon complete object tree traversal, the various constituent commands of the composite command may be executed to create the graphics rendering tree (block 930). For example, as illustrated in FIGS. 19-25, each command of composite command 1010 may be executed to create graphics rendering object tree 800. In one implementation, the commands of composite command 1010 may be executed sequentially. FIG. 19 illustrates "create node command" 1100 being executed to create objects 810-1A and 810-1B in graphics rendering tree 800. FIG. 20 further illustrates "create node command" 1200 and "insert child command" 1210 being executed to create object 810-2 in graphics rendering object tree 800. FIG. 21 additionally illustrates "create node command" 1300 and "insert child command" 1310 being executed to create object 810-3 in graphics rendering object tree 800. FIG. 22 further illustrates "create node command" 1400 and "insert child command" 1410 being executed to create object 810-4 in graphics rendering object tree 800. FIG. 23 also illustrates "create node command" 1500 and "insert child command" 1510 being executed to create object 810-5 in graphics rendering object tree 800. FIG. 24 additionally depicts "create node command" 1600 and "insert child command" 1610 being executed to create object 810-6 in graphics rendering object tree 800. FIG. 25 further depicts "create node command" 1700 and "insert child command" 1710 being executed to create object 810-7 in graphics rendering object tree 800.

Exemplary Graphics Rendering Process

Figure 26:
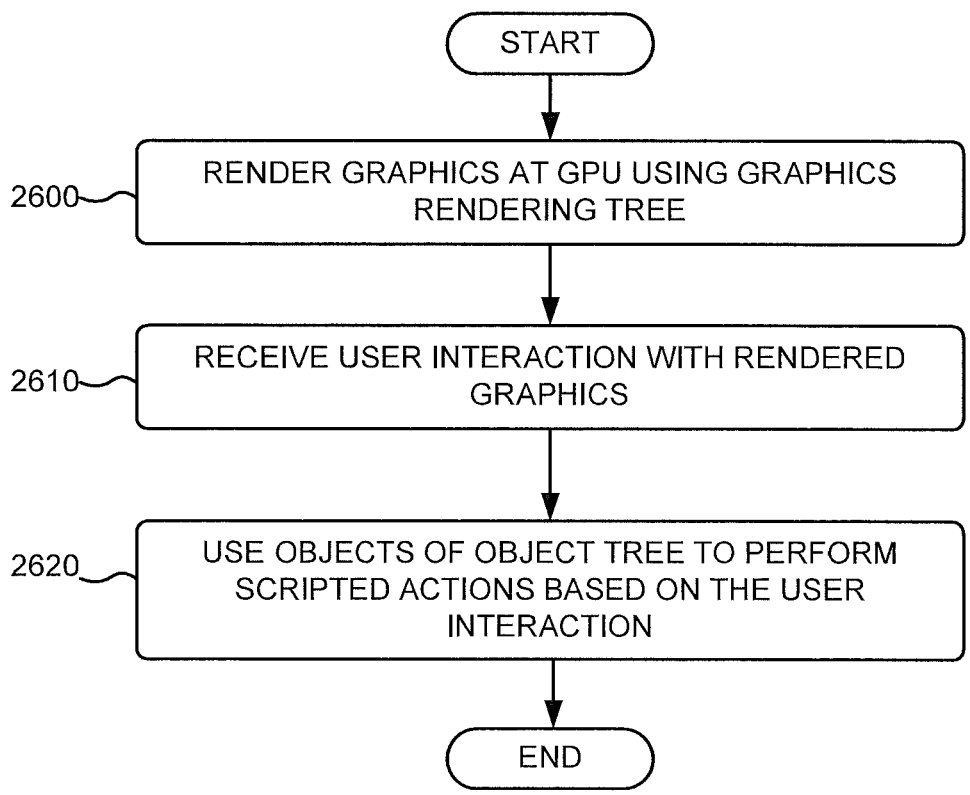
FIG. 26 is a flowchart of an exemplary process for rendering graphics based on a previously created graphics rendering tree.

FIG. 26 is a flowchart of an exemplary process for rendering graphics based on a previously created graphics rendering tree. Block 2600 of FIG. 26 may be implemented by specialized processing unit 130 (e.g., a GPU) of a client 210 or server 220, and blocks 2610 and 2620 of FIG. 26 may be implemented by processor 125 of client 210 or server 220.

Figure 27:
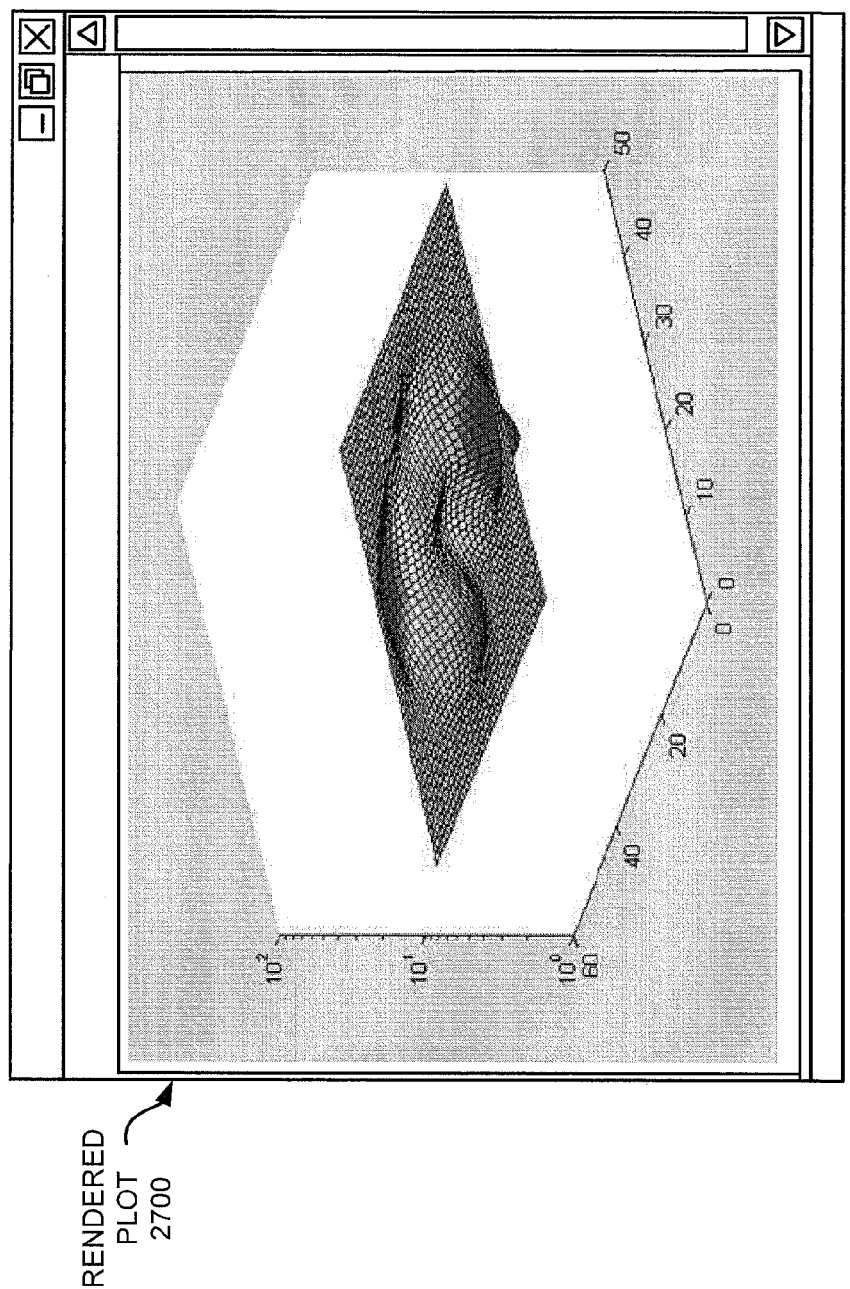
FIG. 27 illustrates an example of a graphics plot rendered using a graphics rendering tree.
Figure 28:
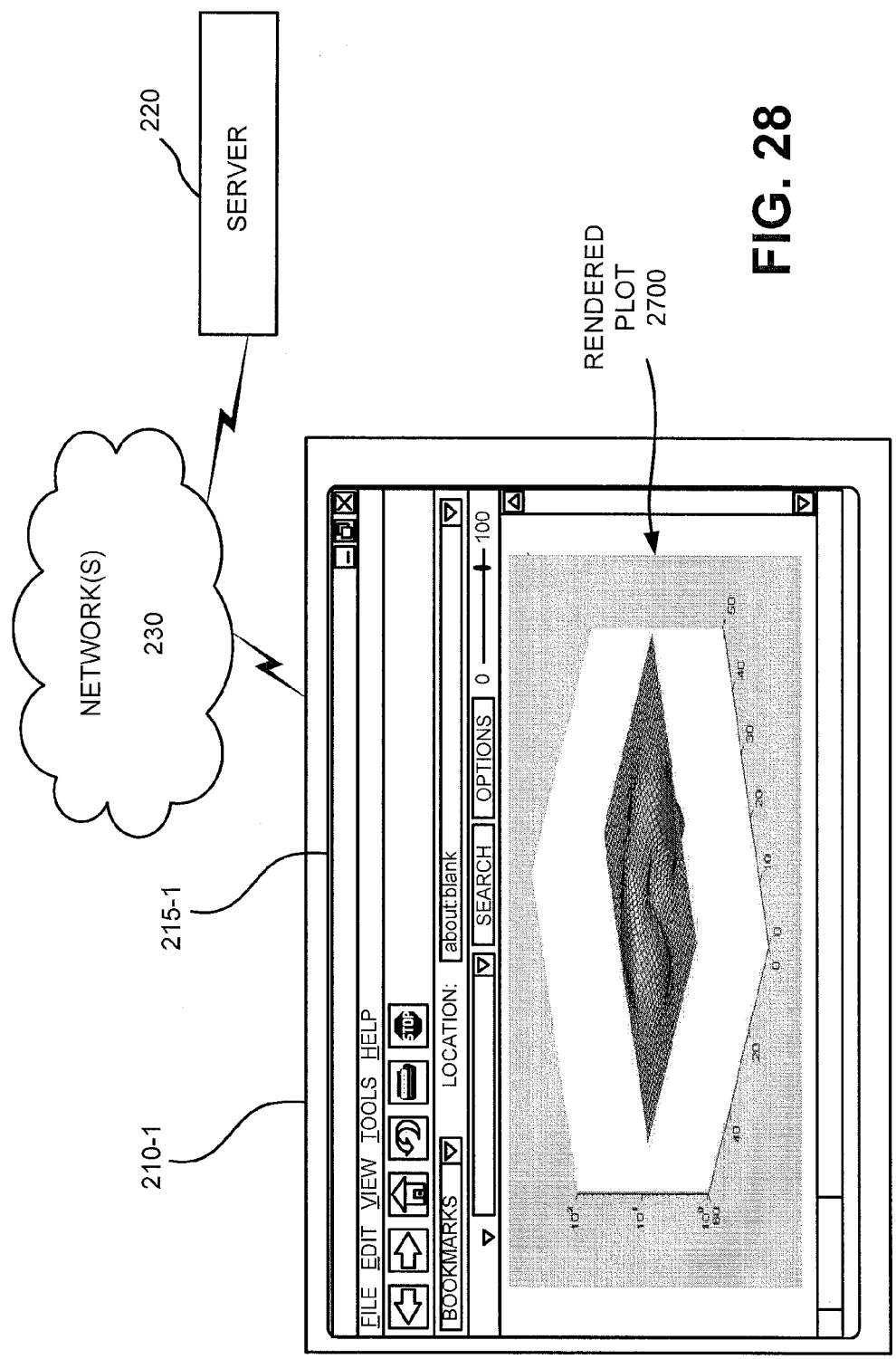
FIG. 28 illustrates another example of a graphics plot rendered using a graphics rendering tree.

The exemplary process may begin with the GPU rendering the graphics using the previously created graphics rendering tree (block 2600). For example, as shown in FIG. 27, the GPU may render a plot 2700 based on the graphics rendering tree 800 of FIG. 25. In some implementations, plot 2700 may be displayed by browser 215, as shown in FIG. 28. Prior to the GPU rendering the graphics using the previously created graphics rendering tree, the contents of the graphics rendering tree may be re-ordered so that state changes can be minimized. For example, state attribute sorting may be used to re-order the contents of the graphics rendering tree prior to the GPU rendering the graphics. Because the GPU typically is deeply "pipelined," the speed of the graphics rendering may be significantly slowed when there are many changes in state. Therefore, improvements in performance (e.g., graphics rendering speed) may be obtained by rendering objects that have the same state together. For example, if a graphics scene uses many objects that have a same state (e.g., a same texture map), better performance may be obtained from the GPU if all of these objects together instead of switching between these and other objects.

User interaction with the rendered graphics may be subsequently received (block 2610). For example, the user may select a different view of the plot 2700. As another example, "mouse" motion events (i.e., movement of the mouse by the user) may change view parameters of a graphical scene. Objects of the object tree may be used to perform scripted actions based on the user interaction (block 2620). For example, in response to the above-described "mouse" motion events, the graphical scene may be redrawn and updated view parameters may be sent back to an object in the object tree.

Conclusion

Implementations described herein provide illustration and description, but is not intended to be exhaustive or to limit the invention to the precise form disclosed. Modifications and variations are possible in light of the above teachings, or may be acquired from practice of the invention. For example, while a series of blocks have been described with regard to FIGS. 5, 9 and 26, the order of the blocks may be modified in other implementations. Further, non-dependent blocks may be performed in parallel. Some implementations have been described herein with respect to a graphics rendering tree being organized and optimized for use by a GPU. However, it will be appreciated that the embodiments described herein may be equivalently applied to peer object trees organized and optimized for use with other specialized processing units, such as, for example, PPUs or DSPs. Additionally, implementations have been described herein with respect to a general purpose CPU and a specialized processing unit. In other implementations, a first object tree may be associated with a first type of CPU and a second object tree may be associated with a second type of CPU, where the second type of CPU may be faster and/or have additional capabilities as compared to the first type of CPU. Furthermore, in other implementations, the first object tree and the second object tree may be associated with a single CPU, where the single CPU may utilize both of the first and second object trees.

Logic for practicing aspects described herein may be provided to a client via a license. This license may, in some implementations, be tiered so that users have varying degrees of flexibility and/or speed based on the licenses that they have.

Even though particular combinations of features are recited in the claims and/or disclosed in the specification, these combinations are not intended to limit the invention. In fact, many of these features may be combined in ways not specifically recited in the claims and/or disclosed in the specification.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of the aspects have been described without reference to the specific software code, it being understood that software and control hardware could be designed to implement the aspects based on the description herein.

No element, act, block or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable medium storing instructions, the instructions comprising:
   one or more instructions, executable by at least one processor, to cause the at least one processor to:
      create a first set of objects in a first data structure based on data relating to a graphical scene,
         the first set of objects describing the graphical scene;
      create a second set of objects in a second data structure based on the first set of objects in the first data structure,
         at least one object of the first set of objects being associated with at least one object of the second set of objects, and
         one or more properties for an object of the second set of objects being based on information associated with the first data structure;
      modify the second set of objects; and
      provide the modified second set of objects to a browser for rendering the graphical scene.

2. The computer-readable medium of claim 1, where the first data structure is a first object tree and the second data structure is a second object tree.

3. The computer-readable medium of claim 1, where
   the one or more instructions to create the first set of objects include:
      one or more instructions to create the first set of objects from a first library; and
   the one or more instructions to create the second set of objects include:
      one or more instructions to create the second set of objects from a second library.

4. The computer-readable medium of claim 1, where the one or more instructions to create the second set of objects include:
   one or more instructions to create the second set of objects contemporaneously with the creation of the first set of objects.

5. The computer-readable medium of claim 1, where the instructions further comprise:
   one or more instructions to receive one or more commands associated with the first set of objects; and
   one or more instructions to create the second set of objects based on the one or more received commands.

6. The computer-readable medium of claim 1, where
   the first set of objects is created at a client,
   the second set of objects is created at a server that is remote from the client, and
   the browser is to render the graphical scene at the client.

7. The computer-readable medium of claim 1, where
   the first set of objects and second set of objects are created at a server, and
   the browser is to render the graphical scene at a client that is remote from the server.

8. A system comprising:
   a memory to store instructions;
   one or more processors to execute the instructions to:
      create a first set of objects in a first data structure based on data relating to a graphical scene,
         the first set of objects describing the graphical scene;
      create a second set of objects in a second data structure based on the first set of objects in the first data structure,
         at least one object of the first set of objects being associated with at least one object of the second set of objects, and
         one or more properties for an object of the second set of objects being based on information associated with the first data structure;
      modify the second set of objects; and
      provide the modified second set of objects to a browser for rendering the graphical scene.

9. The system of claim 8, where the first data structure is a first object tree and the second data structure is a second object tree.

10. The system of claim 8, where
    the one or more processors, when creating the first set of objects, are further to:
       create the first set of objects from a first library; and
    the one or more processors, when creating the second set of objects, are further to:
       create the second set of objects from a second library.

11. The system of claim 8, where the one or more processors, when creating the second set of objects, are further to:
    create the second set of objects contemporaneously with the creation of the first set of objects.

12. The system of claim 8, where the one or more processors are further to:
   receive one or more commands associated with the first set of objects; and
   create the second set of objects based on the one or more received commands.
13. The system of claim 8, where
   the first set of objects is created at a client,
   the second set of objects is created at a server that is remote from the client, and
   the browser is to render the graphical scene at the client.
14. The system of claim 8, where
   the first set of objects and second set of objects are created at a server, and
   the browser is to render the graphical scene at a client that is remote from the server.
15. A method comprising:
   creating a first set of objects in a first data structure based on data relating to a graphical scene,
      the first set of objects describing the graphical scene, and
      the creating the first set of objects being performed by one or more computing devices;
   creating a second set of objects in a second data structure based on the first set of objects in the first data structure,
      at least one object of the first set of objects being associated with at least one object of the second set of objects,
      one or more properties for an object of the second set of objects being based on information associated with the first data structure, and
      the creating the second set of objects being performed by the one or more computing devices;
   modifying the second set of objects,
      the modifying the second set of objects being performed by the one or more computing devices; and
   providing the modified second set of objects to a browser for rendering the graphical scene,
      the providing the modified second set of objects being performed by the one or more computing devices.
16. The method of claim 15, further comprising:
   receiving one or more commands associated with the first set of objects; and
   creating the second set of objects based on the one or more received commands.
17. The method of claim 15, where
   when creating the first set of objects, the method includes:
      creating the first set of objects from a first library; and
   when creating the second set of objects the method includes:
      creating the second set of objects from a second library.
18. The method of claim 15, where, when creating the second set of objects, the method includes:
   creating the second set of objects contemporaneously with the creation of the first set of objects.
19. The method of claim 15, where
   the first set of objects is created at a client,
   the second set of objects is created at a server that is remote from the client, and
   the browser is to render the graphical scene at the client.
20. The method of claim 15, where
   the first set of objects and second set of objects are created at a server, and
   the browser is to render the graphical scene at a client that is remote from the server.

\* \* \* \* \*